(12) United States Patent
Bau

(10) Patent No.: US 8,245,842 B2
(45) Date of Patent: Aug. 21, 2012

(54) PROTECTIVE CASE HAVING A HYBRID STRUCTURE FOR PORTABLE HANDHELD ELECTRONIC DEVICES

(75) Inventor: Steven Chi Vun Bau, Tracy, CA (US)

(73) Assignee: Switcheasy Limited, Kowloon (HK)

( * ) Notice: Subject to any disclaimer, the term of this patent is extended or adjusted under 35 U.S.C. 154(b) by 167 days.

(21) Appl. No.: 12/459,395

(22) Filed: Jun. 29, 2009

(65) Prior Publication Data
US 2010/0096284 A1    Apr. 22, 2010

Related U.S. Application Data

(63) Continuation-in-part of application No. 29/312,006, filed on Sep. 23, 2008, now Pat. No. Des. 610,807.

(60) Provisional application No. 61/188,084, filed on Aug. 5, 2008, provisional application No. 61/133,365, filed on Jun. 27, 2008.

(51) Int. Cl.
   *B65D 85/00*   (2006.01)
(52) U.S. Cl. ............. 206/320; 206/305; 455/575.8
(58) Field of Classification Search ............ 206/372, 206/373, 305, 320; 150/165, 154; 190/127; D14/250; 455/90.3, 575.1, 575.8; 339/446, 339/433.11; 246/250
   See application file for complete search history.

(56) References Cited

U.S. PATENT DOCUMENTS

| | | | | |
|---|---|---|---|---|
| 5,242,056 A | * | 9/1993 | Zia et al. | 206/576 |
| 6,456,487 B1 | * | 9/2002 | Hetterick | 361/679.3 |
| 6,616,111 B1 | * | 9/2003 | White | 248/309.1 |
| 6,701,159 B1 | * | 3/2004 | Powell | 455/575.8 |
| 6,971,517 B2 | * | 12/2005 | Chen | 206/372 |
| 7,225,923 B2 | * | 6/2007 | Hallee et al. | 206/373 |
| D557,261 S | * | 12/2007 | Rickard | D14/250 |
| D565,291 S | * | 4/2008 | Brandenburg et al. | D3/218 |
| D575,056 S | * | 8/2008 | Tan | D3/218 |
| D581,151 S | * | 11/2008 | Aipa | D3/201 |
| 7,495,895 B2 | * | 2/2009 | Carnevali | 361/679.26 |
| D589,016 S | * | 3/2009 | Richardson et al. | D14/138 AA |
| D606,751 S | * | 12/2009 | Andre et al. | D3/269 |
| 7,630,746 B2 | * | 12/2009 | Holmberg | 455/575.8 |
| D610,807 S | * | 3/2010 | Bau | D3/269 |
| D628,994 S | * | 12/2010 | Griffin et al. | D14/250 |
| 2003/0068035 A1 | * | 4/2003 | Pirila et al. | 379/447 |
| 2005/0065539 A1 | * | 3/2005 | Muser | 606/161 |
| 2005/0116003 A1 | * | 6/2005 | Butler et al. | 224/604 |

(Continued)

FOREIGN PATENT DOCUMENTS

EP    1 096 759    *    5/2001

(Continued)

*Primary Examiner* — David Fidei
(74) *Attorney, Agent, or Firm* — Liu & Liu

(57) ABSTRACT

A protective case for handheld devices with improved protection characteristics, durability, convenience of use, and functionalities without compromising aesthetics. The protective case includes a "glove" or "skin" piece of a softer material that substantially covers and grips the entire back of the electronic device, by wrapping over the edge of the electronic device (without obscuring the display/touch screen on the front of the device). One or more separate complementary frame pieces, braces and the like made of a hard material are attached over the glove piece, extending over a substantial area of the glove piece, thereby creating a robust interlocking hybrid structure. Openings are provided in the protective case to allow for user interaction with the device, including access to the interfaces (e.g., screens, buttons, sockets, etc.) provided on the device.

21 Claims, 29 Drawing Sheets

U.S. PATENT DOCUMENTS

| | | | |
|---|---|---|---|
| 2005/0139498 A1* | 6/2005 | Goros | 206/320 |
| 2008/0163463 A1* | 7/2008 | Hulden | 16/430 |
| 2008/0251512 A1* | 10/2008 | Griffin et al. | 220/4.02 |
| 2009/0113758 A1* | 5/2009 | Nishiwaki et al. | 36/88 |
| 2009/0114556 A1* | 5/2009 | Tai et al. | 206/320 |

FOREIGN PATENT DOCUMENTS

| | | | |
|---|---|---|---|
| EP | 1 301 011 | * | 9/2002 |
| WO | WO 2007/122722 | * | 1/2007 |

* cited by examiner

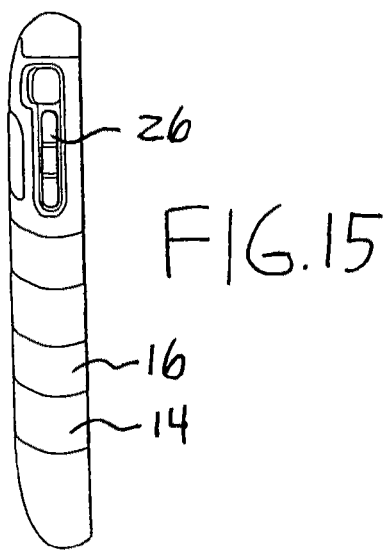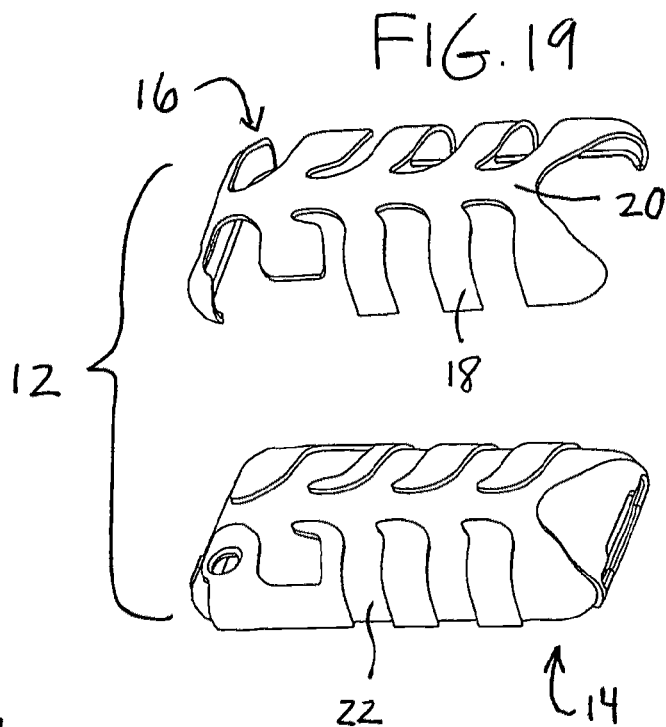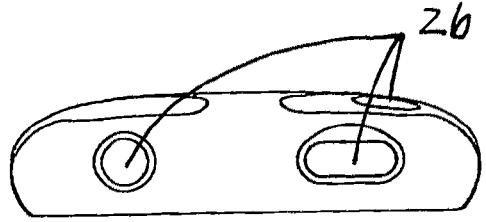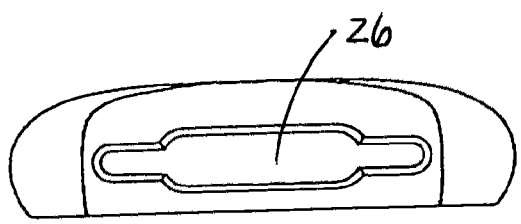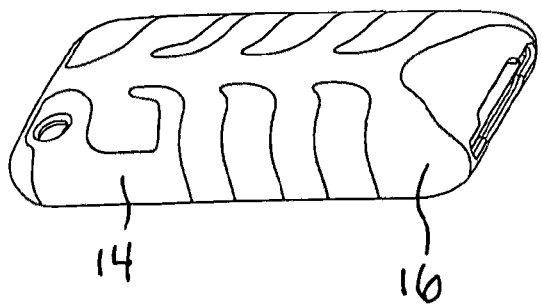

Product Name: Rebel

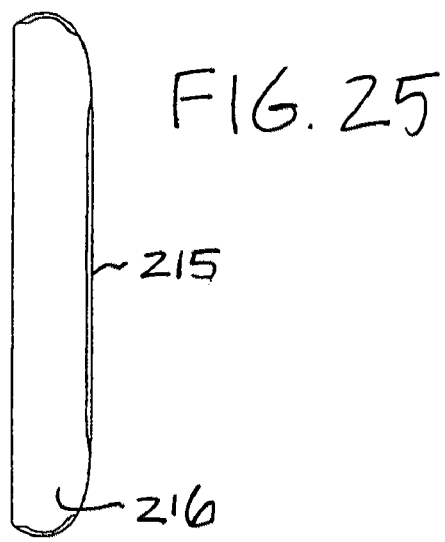
FIG. 25
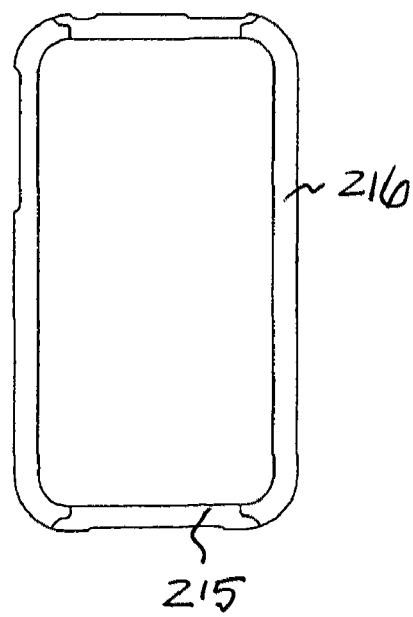
FIG. 28
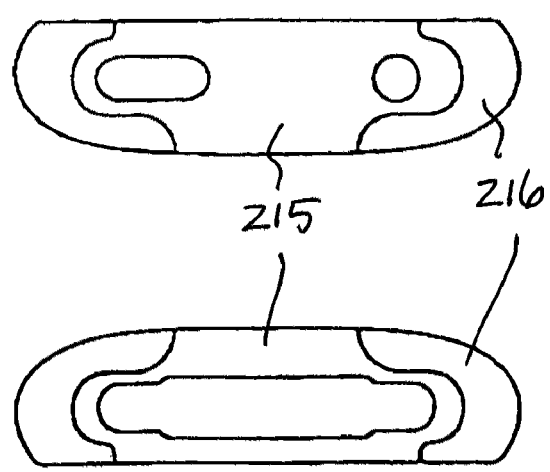
FIG. 26
FIG. 27

Product Name: Neo

US 8,245,842 B2

PROTECTIVE CASE HAVING A HYBRID STRUCTURE FOR PORTABLE HANDHELD ELECTRONIC DEVICES

CROSS REFERENCE

This application claims priority and is a continuation-in-part of: (a) U.S. Design Patent Application No. 29/312,006, filed on Sep. 23, 2008 now U.S. Pat. No. D610,807; (b) U.S. Provisional Patent Application No. 61/188,084, filed on Aug. 5, 2008; and (c) U.S. Provisional Patent Application No. 61/133,365, filed on Jun. 27, 2008. These applications are fully incorporated by reference as if fully set forth herein.

FIELD OF THE INVENTION

The present invention relates to protective cases for handheld electronic devices.

BACKGROUND OF THE INVENTION

For modern personal electronic devices, the trend is to adopt a thin housing profile and a large display screen (e.g., touch sensitive user interface). An example of a popular handheld device is the Apple iPhone. Other devices include without limitation MP3 players, etc. Such devices contain sensitive and/or delicate electronics. The devices are subject to physical abuse and risks of damages from handling of the devices, especially given the portable nature of the devices (e.g., dropping of the devices, or otherwise subjecting the devices to physical shocks, dents and scratches).

Handheld devices typically are built with a housing that can withstand certain level of physical abuse. However, in an effort to improve aesthetics, the housings are typically designed to have finishes that look appealing, but often at the compromise of structural integrity. A nicely finished housing is more prone to damages, and even slight blemishes would be more noticeable on a highly finished housing. For example, the iPhone housing is finished with a highly polished metal back panel. Any dent and/or scratch on the finished panel would be highly noticeable.

Auxiliary cases have been designed to wrap around handheld devices to provide an additional level of protection. However heretofore, protective cases increase significant overall bulk and weight, and could mar or damage the delicate finish of the devices. The existing cases are also not as convenient to use, and the durability and protective coverage of the cases are more to be desired. Existing protective cases do not strike a well balance between protection, functionalities and aesthetics. For example, there exists an all-silicon soft case that wraps the entire device housing except the screen. However, such case is not aesthetically appealing. Aesthetically appealing cases typically offer less protection. Further, modern handheld devices require user interactions with the devices via various interfaces (e.g., screens, buttons, sockets, etc.), the access to which could be hindered by the structure of existing protective cases.

It is therefore desirable to have a protective case with improved protection characteristics, durability, convenience of use, and functionalities without compromising aesthetics.

SUMMARY OF THE INVENTION

The present invention is directed to a protective case for handheld devices with improved protection characteristics, durability, convenience of use, and functionalities without compromising aesthetics.

In accordance with the present invention, the protective case includes a "glove" or "skin" piece of a softer material that substantially covers and grips the entire back of the electronic device, by wrapping over the edge of the electronic device (without obscuring the display/touch screen on the front of the device). The glove is non-abrasive to the delicate finish of the device. One or more separate complementary frame pieces, braces and the like made of a hard material are attached over the glove piece, extending over a substantial area of the glove piece, thereby creating a robust interlocking hybrid structure. The multi-piece hybrid protective case may further include a front protective membrane to protect the display/touch screen of the device. Openings are provided in the protective case to allow for user interaction with the device, including access to the interfaces (e.g., screens, buttons, sockets, etc.) provided on the device. The resultant interlocking hybrid structure defines a robust protective case for a personal electronic device, which provides a well balance of form and substance with respect to protection of the device held by the case, and without affecting the use of the device.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 13 to 18 are corresponding line drawings of the protective case in FIGS. 1-10, without the electronic device held therein.

FIG. 19 is a perspective exploded view of the exoskeleton frame and the glove components of the inventive protective case in accordance with the first embodiment of the present invention.

FIGS. 23 to 28 are corresponding line drawings of different views of the protective case in FIG. 21, without the electronic device held therein.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The protective case of the present invention may be sized and structured to protect a personal electronic device, typically with a display screen (e.g., liquid crystal display), for example: personal digital assistant (PDA) and handheld computers; digital media devices, such as an MP3 player, digital recorder, portable TV, radio, etc.; wireless devices, such as a cellular phone (e.g., Apple iPhone), two-way radio, etc.; handheld devices, such as global positioning system (GPS), etc.; gaming devices, such as portable versions of computer gaming (Nintendo, Sony PlayStation), etc.; digital photo and video cameras, etc.

The protective case of the present invention comprises a capsulated rear protective structure of multiple complementary pieces (i.e., two or more discreet, separate pieces), which can be assembled onto the electronic device to form a protective structure to protect the edges and back of the device.

In accordance with the present invention, the protective case includes a "glove" or "skin" piece of a softer material that substantially covers and grips the entire back of the electronic device, by wrapping over the edge of the electronic device (without obscuring the display/touch screen on the front of the device). The glove is non-abrasive to the delicate finish of the device. One or more separate complementary frame pieces, braces and the like made of a hard material are attached over the glove piece, thereby creating a robust interlocking hybrid structure. The multi-piece hybrid protective case may further include a front protective membrane to protect the display/touch screen of the device. Openings are provided in the case to allow for user interactions with the device, including user access to the interfaces (e.g., screens, buttons, sockets, etc.) provided on the device. The resultant interlocking hybrid structure defines a robust protective case for a personal electronic device, which provides a well balance of form and substance with respect to protection of the device held by the case, and without affecting the use of the device, such as the display and/or touch sensitivity of the display screen.

The protective case of the present invention will be described below in reference to the Apple iPhone as an exemplary electronic device that can be effectively protected by the inventive protective case. At least two primary embodiments will be described, one have a 2-piece protective structure, and another having a 3-piece protective structure.

Embodiment One

2-Piece Protective Structure

Figure 1:
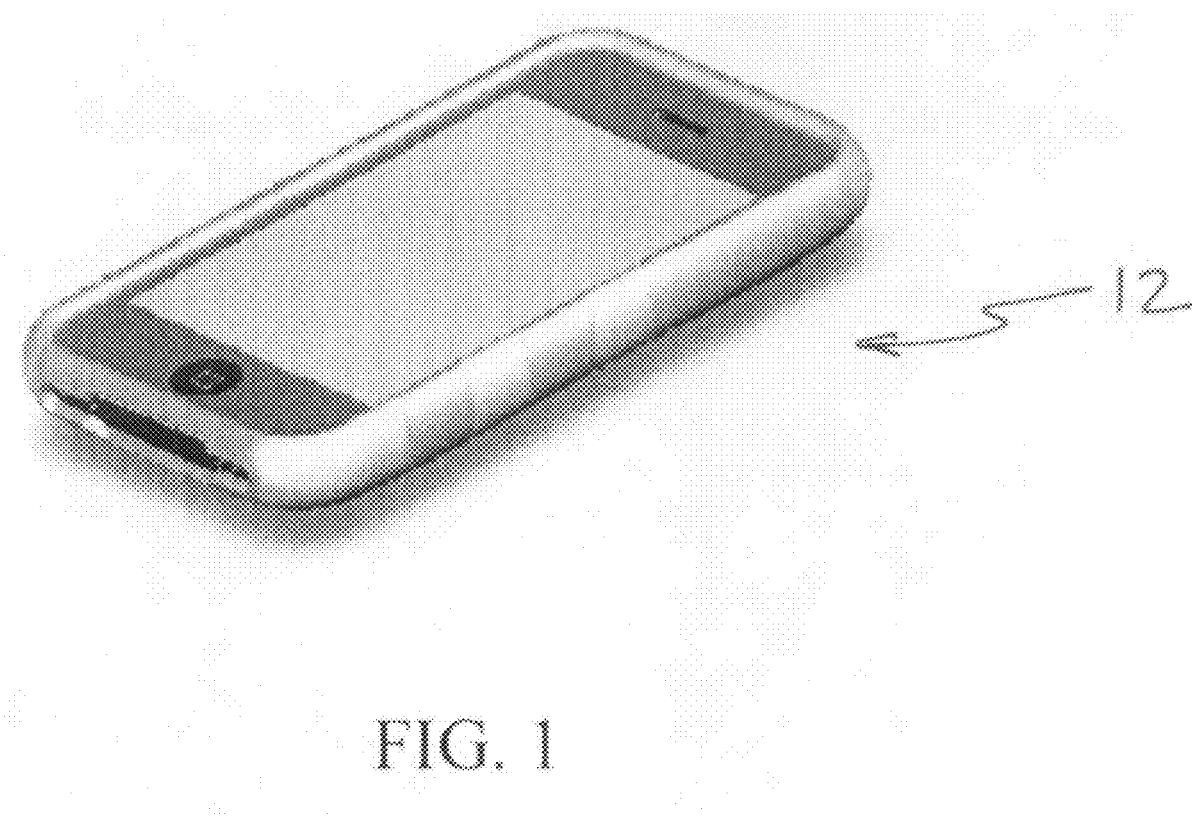
FIG. 1 is a front and top perspective view of a protective case holding a portable handheld electronic device, in accordance with a first embodiment of the present invention.
Figure 2:
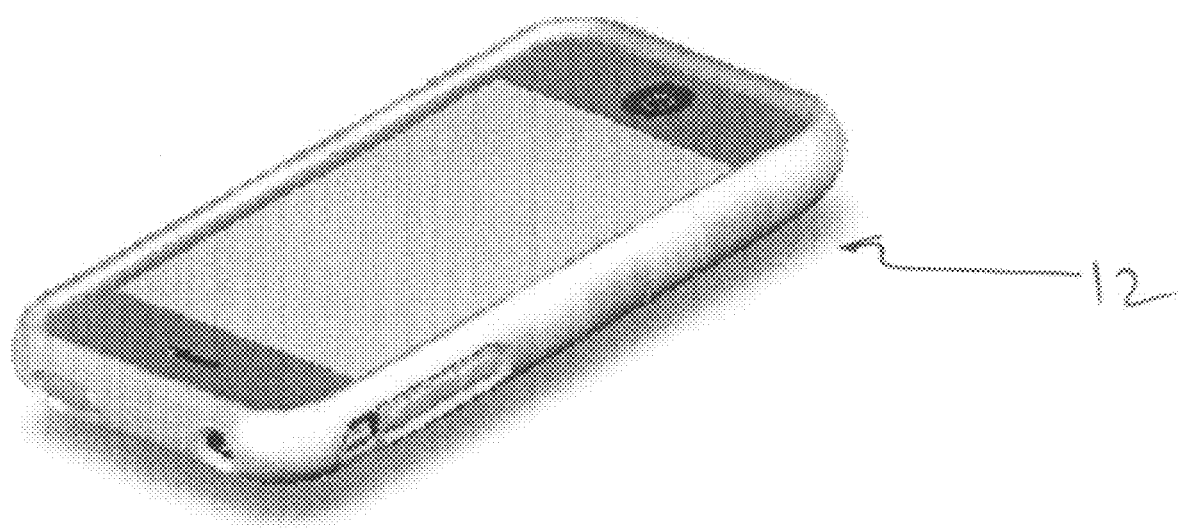
FIG. 2 is a rear and top perspective view thereof.
Figure 3:
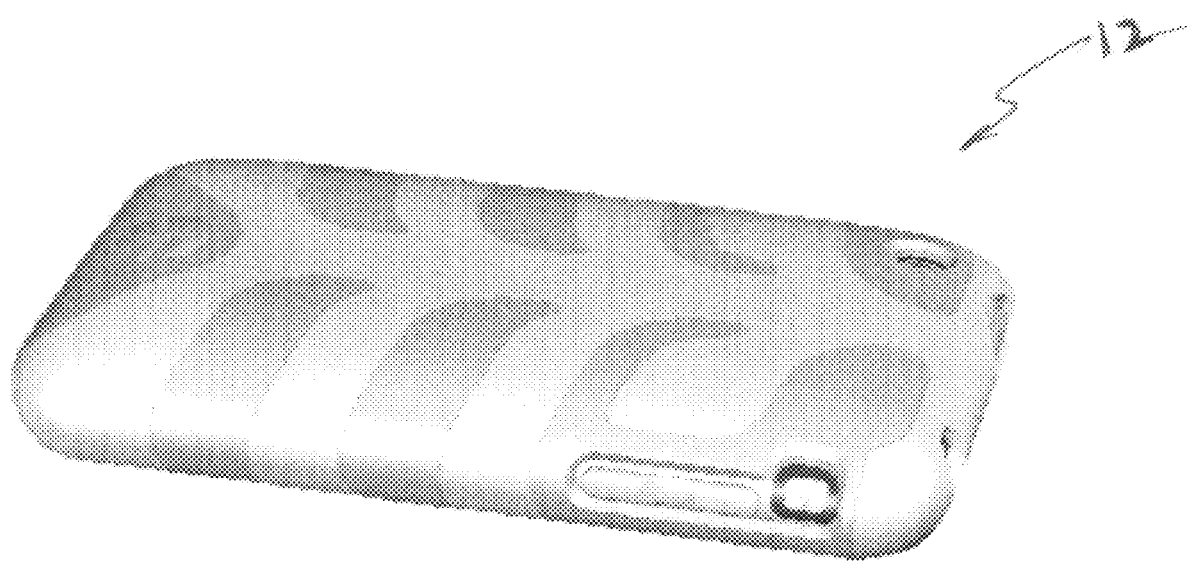
FIG. 3 is a bottom and left perspective view thereof.
Figure 4:
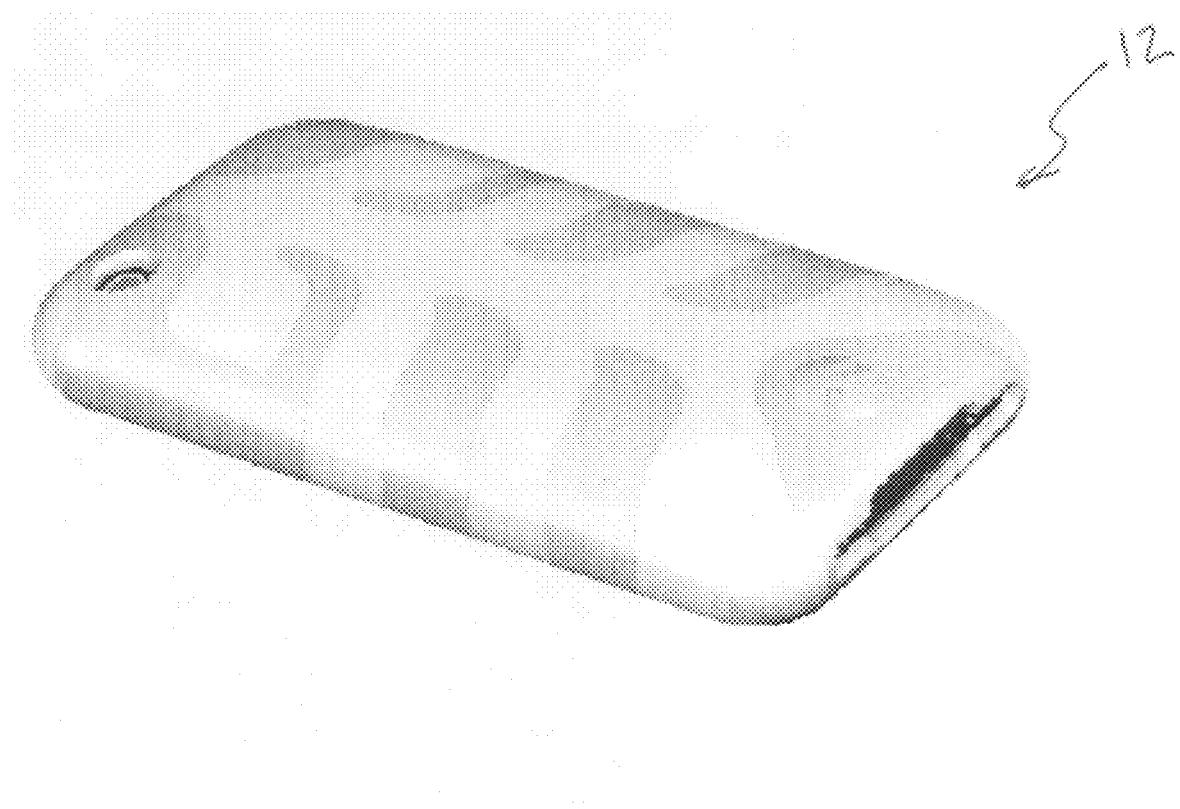
FIG. 4 is a bottom and right perspective view thereof.
Figure 5:
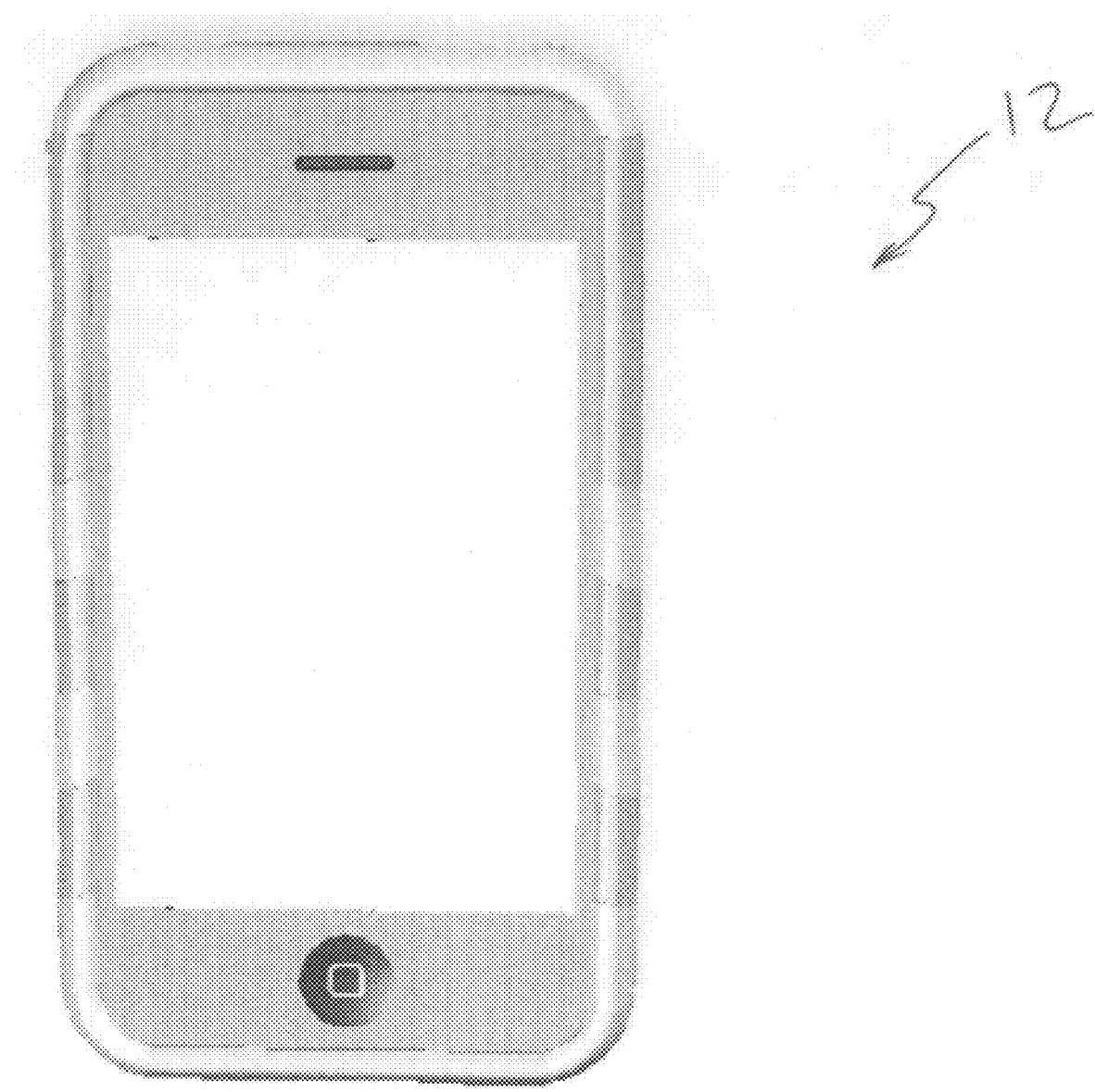
FIG. 5 is a top plan view thereof.
Figure 6:
FIG. 6 is a bottom plan view thereof.
Figure 7:
FIG. 7 is a right side view thereof.
Figure 8:
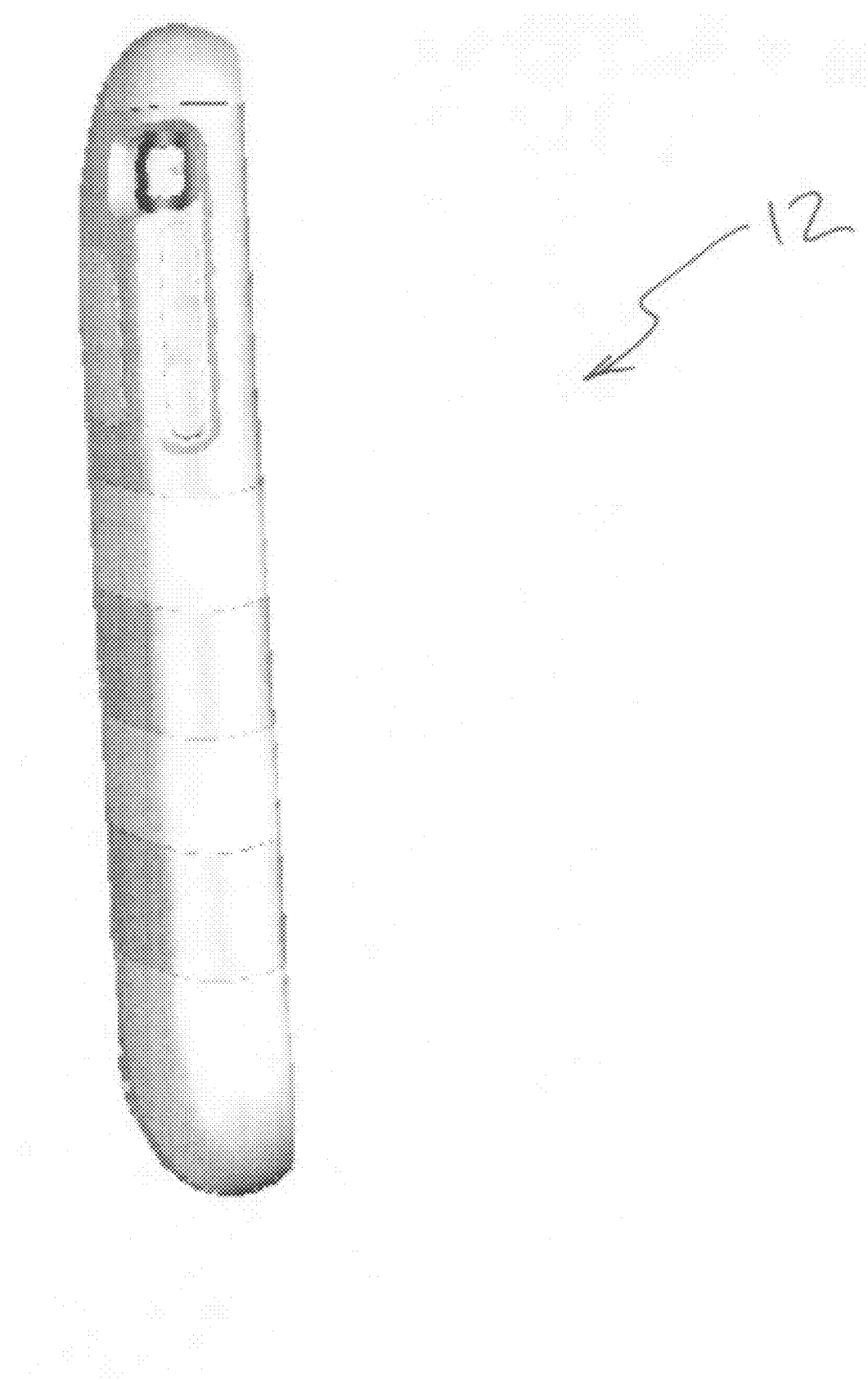
FIG. 8 is a left side view thereof.
Figure 9:
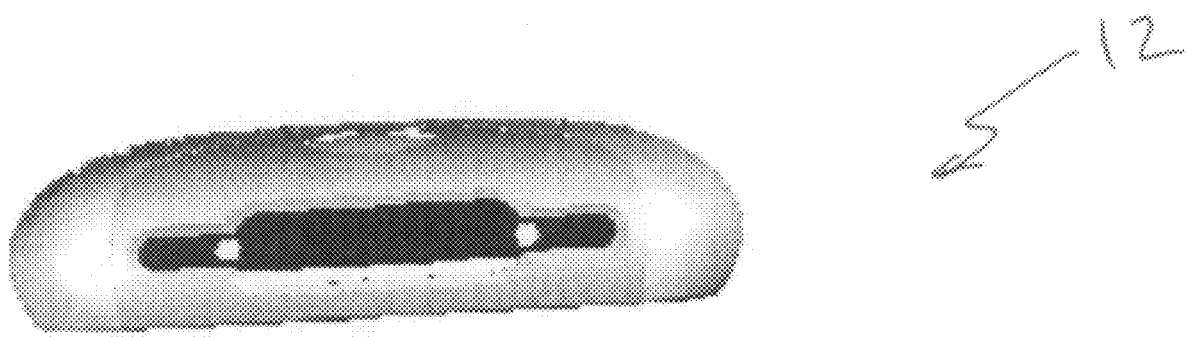
FIG. 9 is front view thereof.
Figure 10:
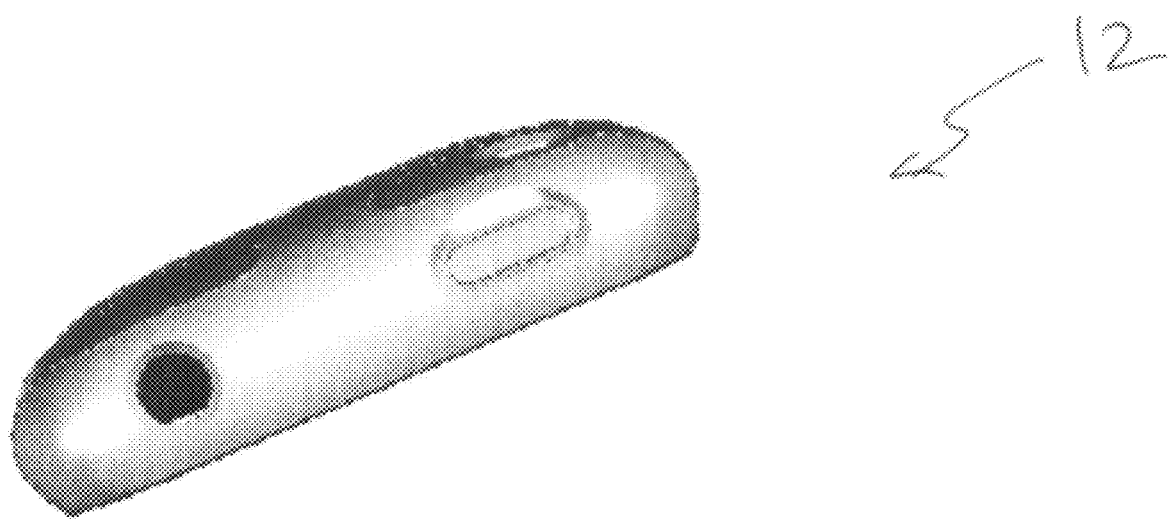
FIG. 10 is rear view thereof.
Figure 11:
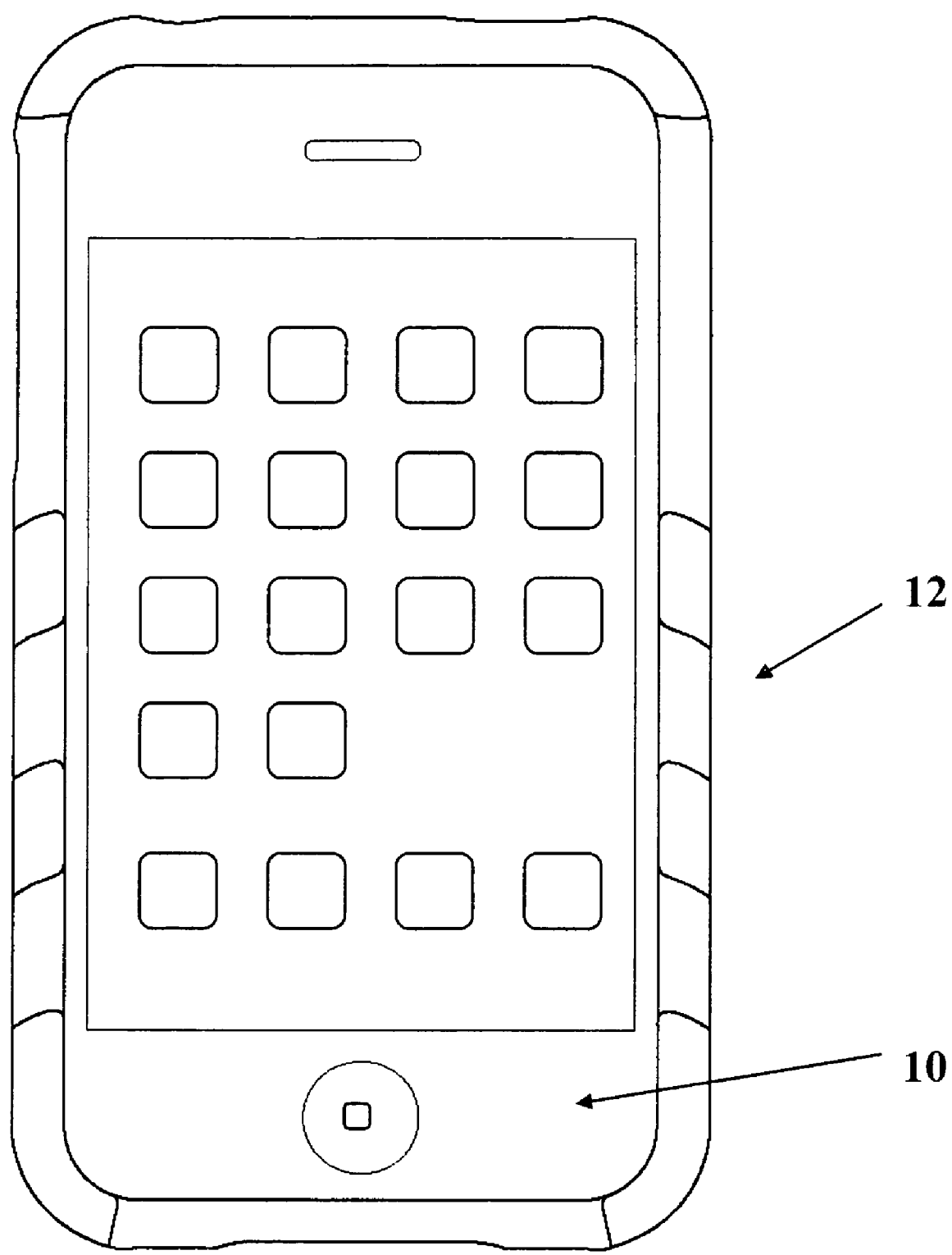
FIG. 11 is a front view of the electronic device as held in the inventive protective case above.
Figure 12:
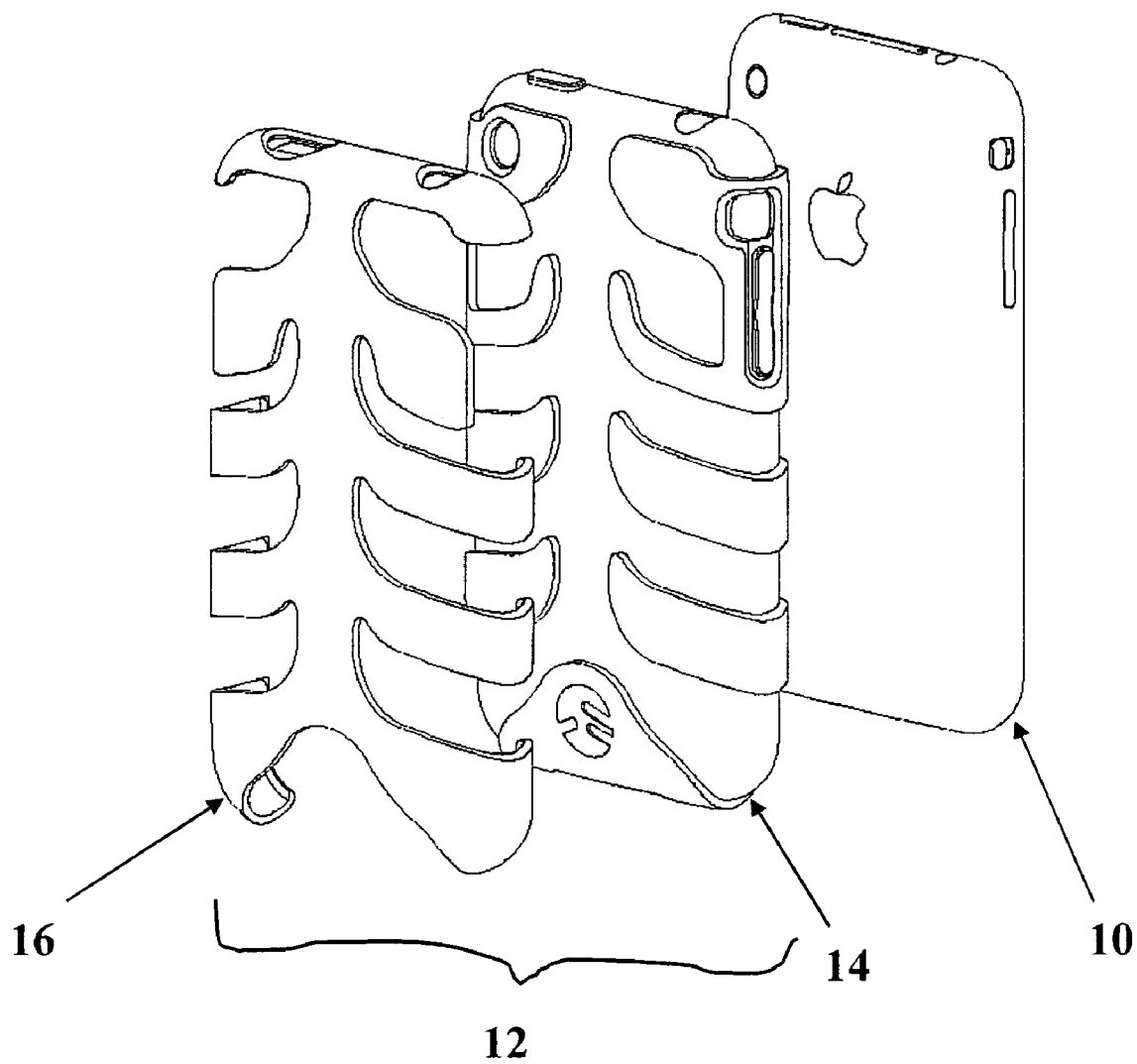
FIG. 12 is a perspective exploded view of the inventive protective case above and the electronic device.
Figure 13:
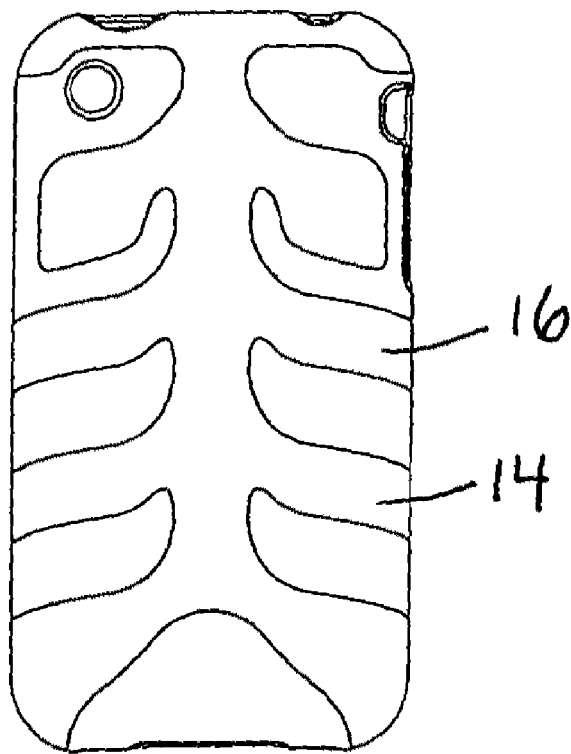
Figure 14:
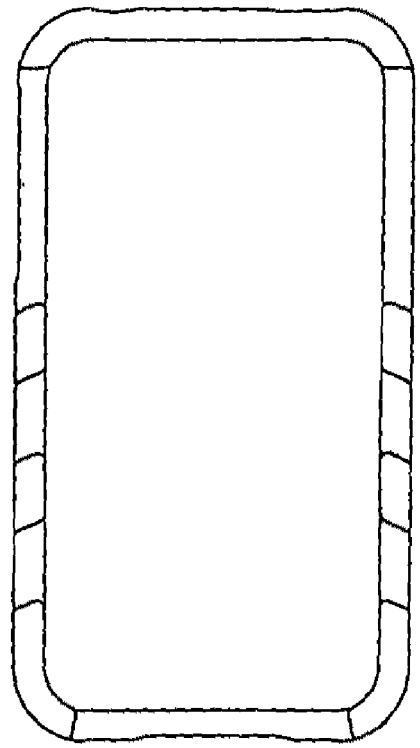

Reference is made to FIGS. 1-20. FIG. 11 shows the example of an electronic device in the form of a smart phone 10 (in the illustration, the electronic device resembles an Apple iPhone) held by a protective case 12 in accordance with one embodiment of the present invention. The protective case 12 exposes the display screen of the phone 10, which could be a touch sensitive screen for user interaction (e.g., user selections by tapping on the icons displayed on the screen). The commercial product implementing the present invention under this embodiment is generally referred to as the "Rebel" product. It comprises a 2-piece rear protective structure; including a tough but soft cover piece (the "glove" or "skin") 14 and a hard frame 16.

The tough but soft glove 14 protects the phone's highly polished back from getting scratched. It snugly covers the entire back panel and the perimeter of the phone 10, like a skin, and exposes screen at the front of the phone 10. The glove 14 is of unitary, one-piece or monolithic structure. The glove 14 is partially covered with a hard plastic flexible exoskeleton frame 16 that grips from the back of the phone 10 and around the phone's edges and corners, thereby completely protecting the housing of the phone.

As illustrated in the figures, the exoskeleton frame 16 is shaped and structure like a claw, or a fishbone, in accordance with one embodiment of the present invention. The frame 16 is of unitary, one-piece or monolithic structure, may be symmetrical about one or both of the orthogonal axes of the phone 10. In the illustrated embodiment, the frame 16 has "ribs" or "fingers" 18 branching, radiating and/or extending from a spine 20 towards the edges and corners of the phone, symmetrical about the long center axis of the phone 10. The fingers 18 press the glove 14 against the back of the phone, and wrap around the glove 14 at the corners and edges of the phone. The tips of the fingers 18 are generally C-shaped in section, grasping or hooking onto the peripheral edges and corners of the phone 10 with a tight snap fit. The fingers 18 facilitate flexing despite the hard material of the frame 16, so that the fingers 18 can be flexed to lock over the edges and corners of the device 10. It is noted that the fingers 18 do not cover the entire length of each edge of the phone 10. The discontinuous coverage of the fingers 18 along the edges of the phone 10 would not result in a relatively unsightly bevel at the edge of the screen of the phone 10. It is noted that the frame 16 covers a substantial area of the glove 14 (e.g., 10-90%, preferably 30-70%, and more preferably about 50%, of the area of the glove 14). The coverage of fingers 18 and spine 20 are essentially substantially distributed over the entire area of the glove 14, even though the coverage of the fingers 18 and spine 20 are not uniformly distributed.

The glove 14 may be configured with a complementary pattern of grooves (e.g., indentations, channels or depressions) 22 (e.g., resembling tire threads with radiating grooves), which are sized and shaped to snugly receives the complementary shaped exoskeleton frame 16. The grooves 22 extend to the corners and edges of the phone 10. The fingers 18 and spine 20 of the frame 16 fits into the grooves 22 when the frame 16 is clipped over the glove 14 and grips the edges and corners of the phone 10. The hard frame 16 thus interlocks with the soft glove 14. The depth of the grooves 22 in the glove 14 may be sized to receive the thickness of the frame 16, such that the fingers 18 and spine frame 16 are substantially flush with or protruding only slightly above the matching grooves 22, to provide an aesthetic seamless appearance.

The soft glove 14 may be made of silicon, soft rubber, or the like flexible, soft, and pliant material (e.g., Engage 8200 Polyolefin Elastomer, available from DOW Plastics). The frame 16 may be made of polycarbonate (e.g., available under the common commercial name of LEXAN®), or other material that is hard and stiff but provides some flexibility for slight bending to clip the frame 16 onto the glove 14 on the device 10. Alternatively, the frame 16 of the protective case 12 may be made of metal (e.g., aluminum, titanium, or light alloy). The glove 14 and/or frame 16 may be available in different colors, textures, finishes, materials, etc. (e.g., the outside surface of the frame 16 is finished with a rubberized texture or coating, such as polyurethane coating), and may be interchangeable and/or mixed-and-matched so users can change the appearance of the protective case 12 to suit individual preferences.

It can be appreciated that the combination of the frame 16 and the glove 14 forms an interlocking structure that is robust, which combines a soft portion for protecting the delicate finish of the device 10, and a hard portion for providing a strong brace to strategically protect the more vulnerable edges and corners of the device 10. The fingers 18 snuggly grip the glove 14 and device 10 at the corners and edges with tight snap fit, thereby securely holding the 2-piece protective structure against the back of the phone 10, and protects the back, corners and edges of the phone. The corners and edges are otherwise more vulnerable to damage when the device 10 is dropped, for example.

An adhesive static membrane 24 is provided (preferably applied prior to putting on the silicon skin) to protect the screen of the device 10. The protective membrane 24 is substantially transparent or at least has a transparent window, and spanning at least the display section or preferably the entire front of the device. The personal electronic device held within the casing is viewable (and/or allow user touch interaction) through the window of transparent membrane 24.

In addition to the membrane covered window of the protective case which allows the user to access the touch screen of the electronic device 10 held within, the glove 14 and the frame 16 are provided with complementary or matching openings 26 for external access to buttons, switches and ports on the electronic device 10 held within (e.g., headphone jack, charging port, docking port, on/off switch, scroll button, etc.), and an opening for a camera lens if provided on the electronic device 10.

Figure 20A:
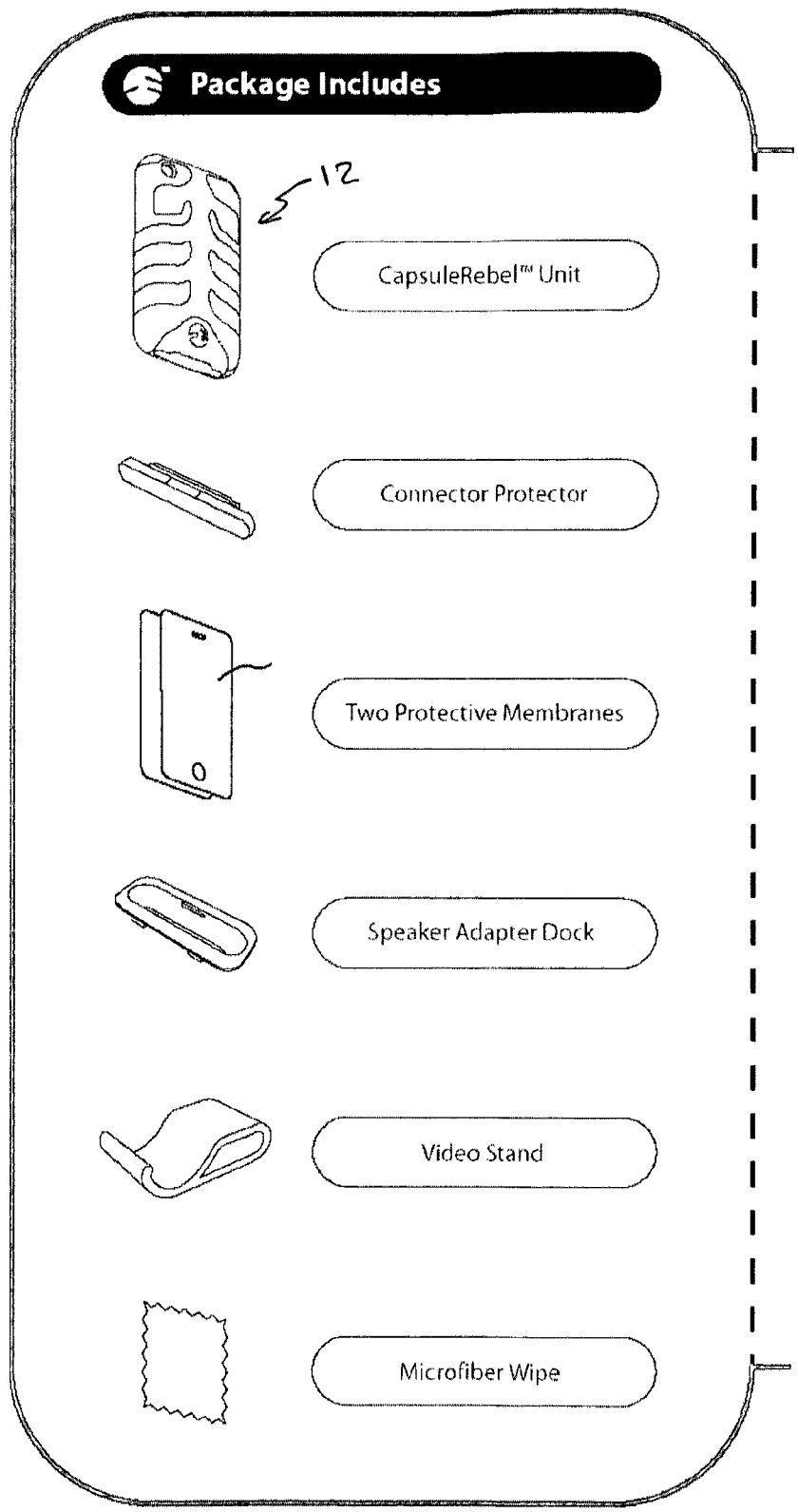
FIGS. 20A to 20C are reproduction of the product manual for the protective case above.
Figure 20B:
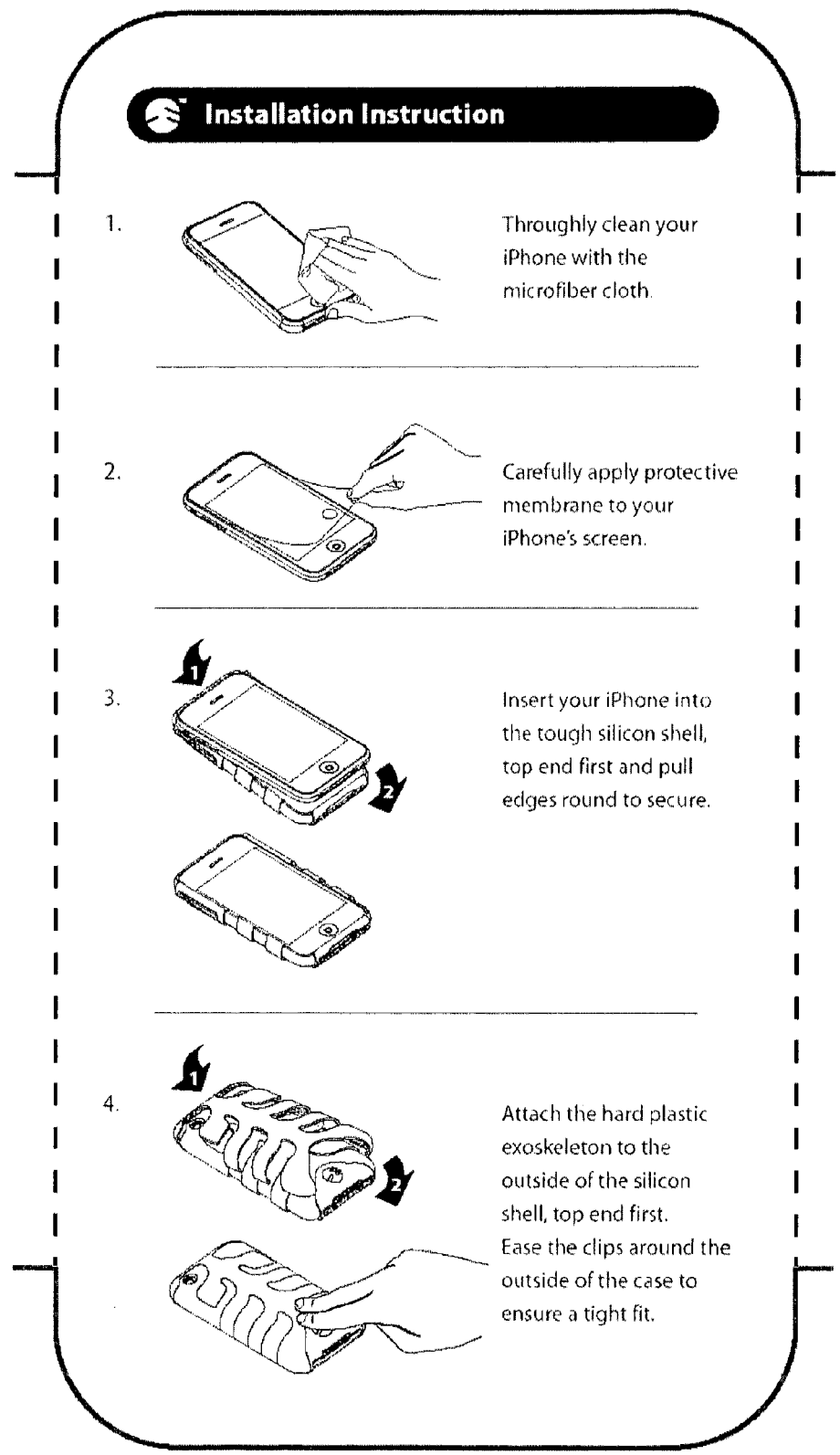
Figure 20C:
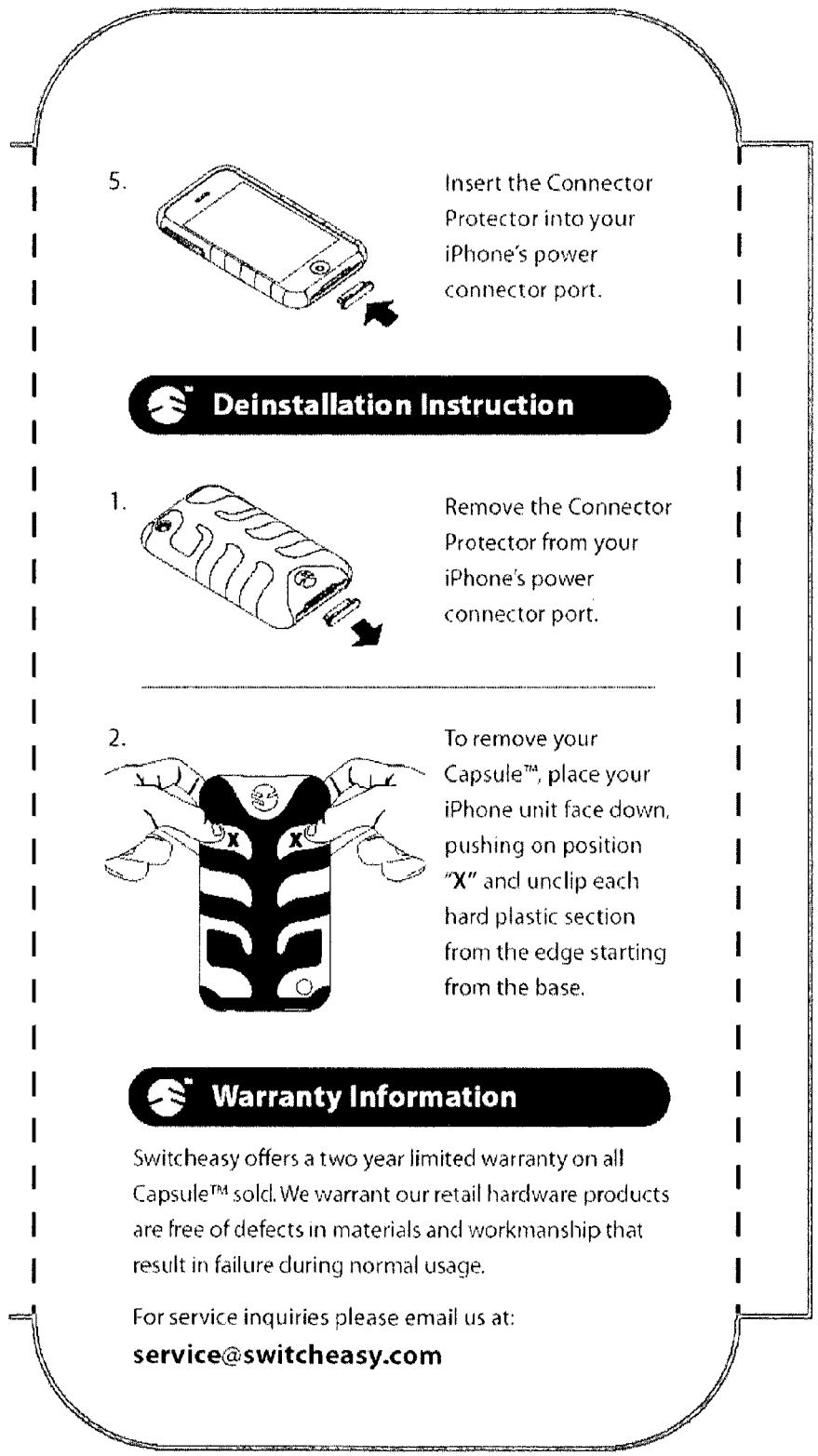

FIGS. 20A to 20C are reproduction of the product manual for the "Rebel" product described above in connection with the Apple iPhone. FIGS. 20A to 20C illustrate the steps of how the glove (or shell) 14 and exoskeleton frame 16 can be installed to protect the devices 10 (in this case the Apple iPhone) and uninstalled therefrom.

Embodiment Two

3-Piece Protective Structure

Figure 21:
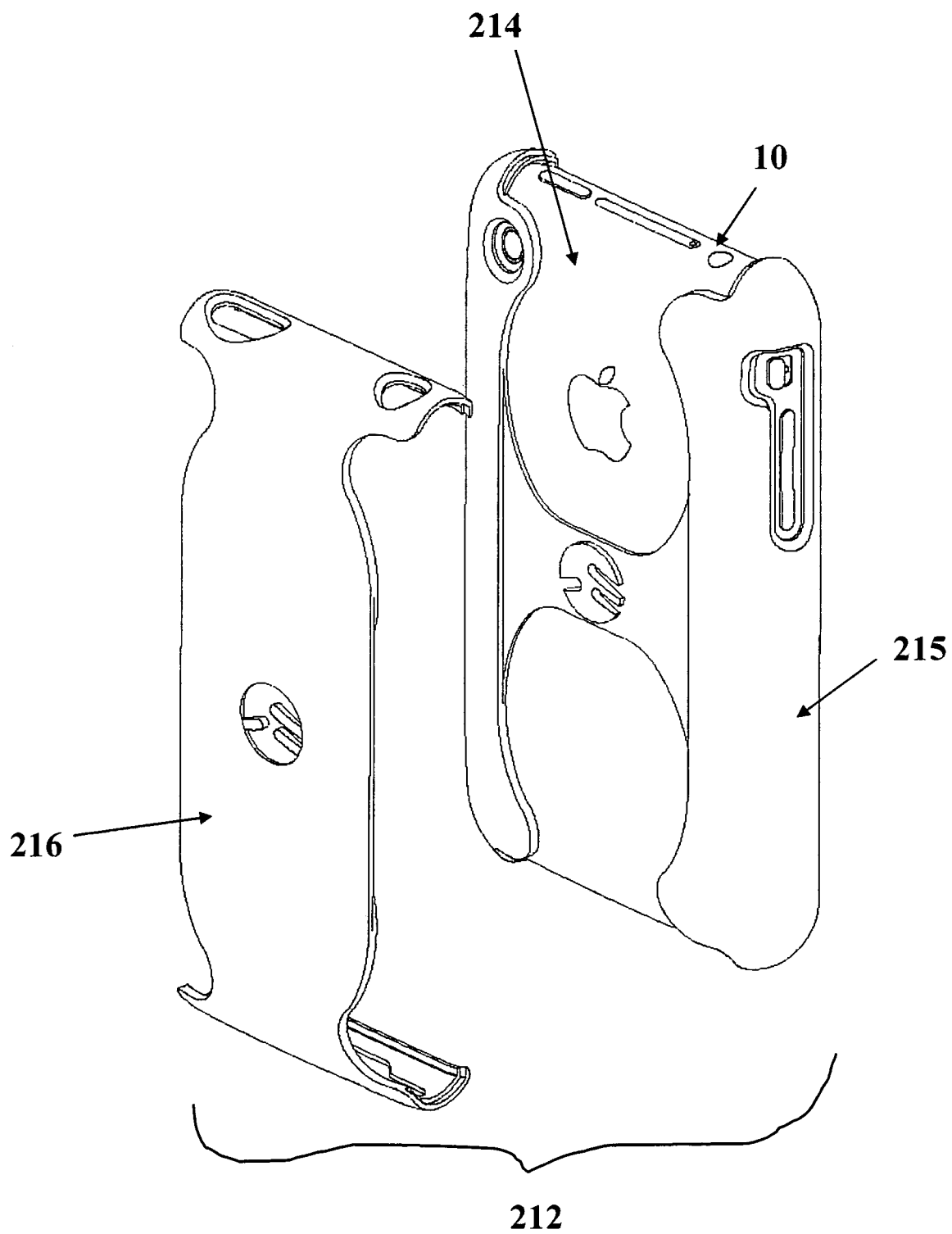
FIG. 21 is a perspective exploded view of the inventive protective case in reference to the electronic device in accordance with a second embodiment of the electronic device.

Reference is made to FIGS. 21-29. FIG. 21 shows the example of an electronic device in the form of a smart phone 10 (similar to the device 10 illustrated in the previous embodiment) held by a protective case 212 in accordance with another embodiment of the present invention. As in the previous embodiment, the protective case 212 exposes the display screen of the phone 10. The commercial product implementing the present invention under this second embodiment is generally referred to as the "Neo" product. It comprises a 3-piece rear protective structure; including an optional soft close fit piece (the "glove" or "skin") 214 (omitted in FIG. 21, but the location of the presence of the skin 214 is indicated in FIG. 21), a hard H-frame 216 and a hard I-clip 215.

Like the previous embodiment, the single piece soft skin 214 protects the phone's highly polished back from getting scratched. The skin 214 snugly covers the entire back panel and the perimeter of the phone 10, and exposes screen at the front of the phone 10. In this embodiment, the glove 214 is thinner than the glove 14 in the previous embodiment, and the skin 214 has a smooth back surface without the grooves as in the previous embodiment.

Figure 22:
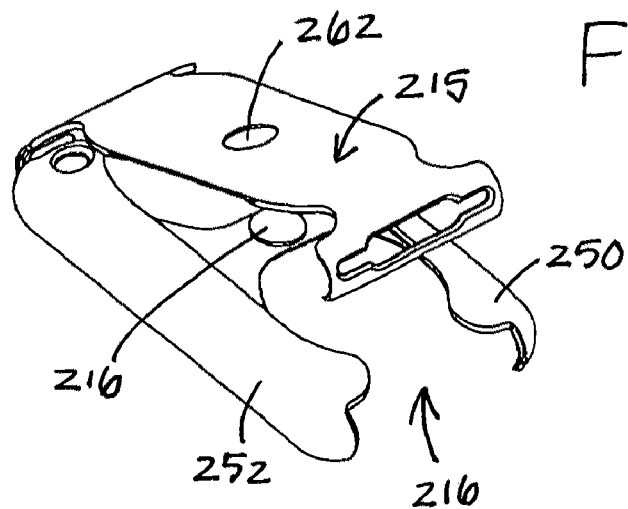
FIG. 22 is a perspective view showing the attachment of the I-clip to the H-frame of the protective case in accordance with the second embodiment, without the electronic device held therein.
Figure 23:
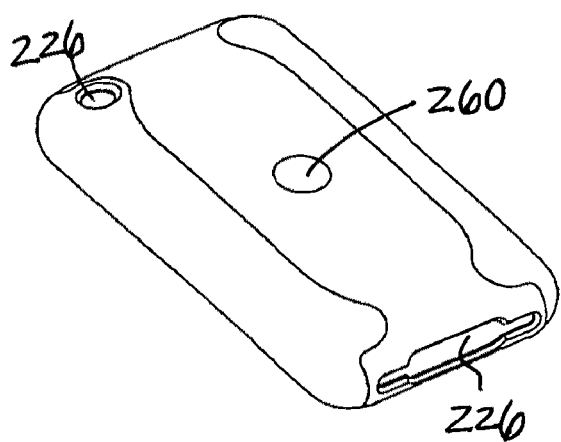
Figure 24:
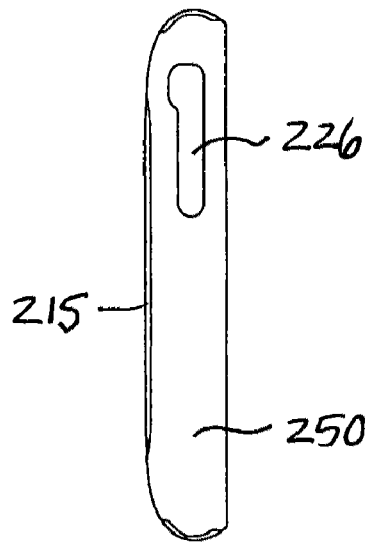
Figure 29A:
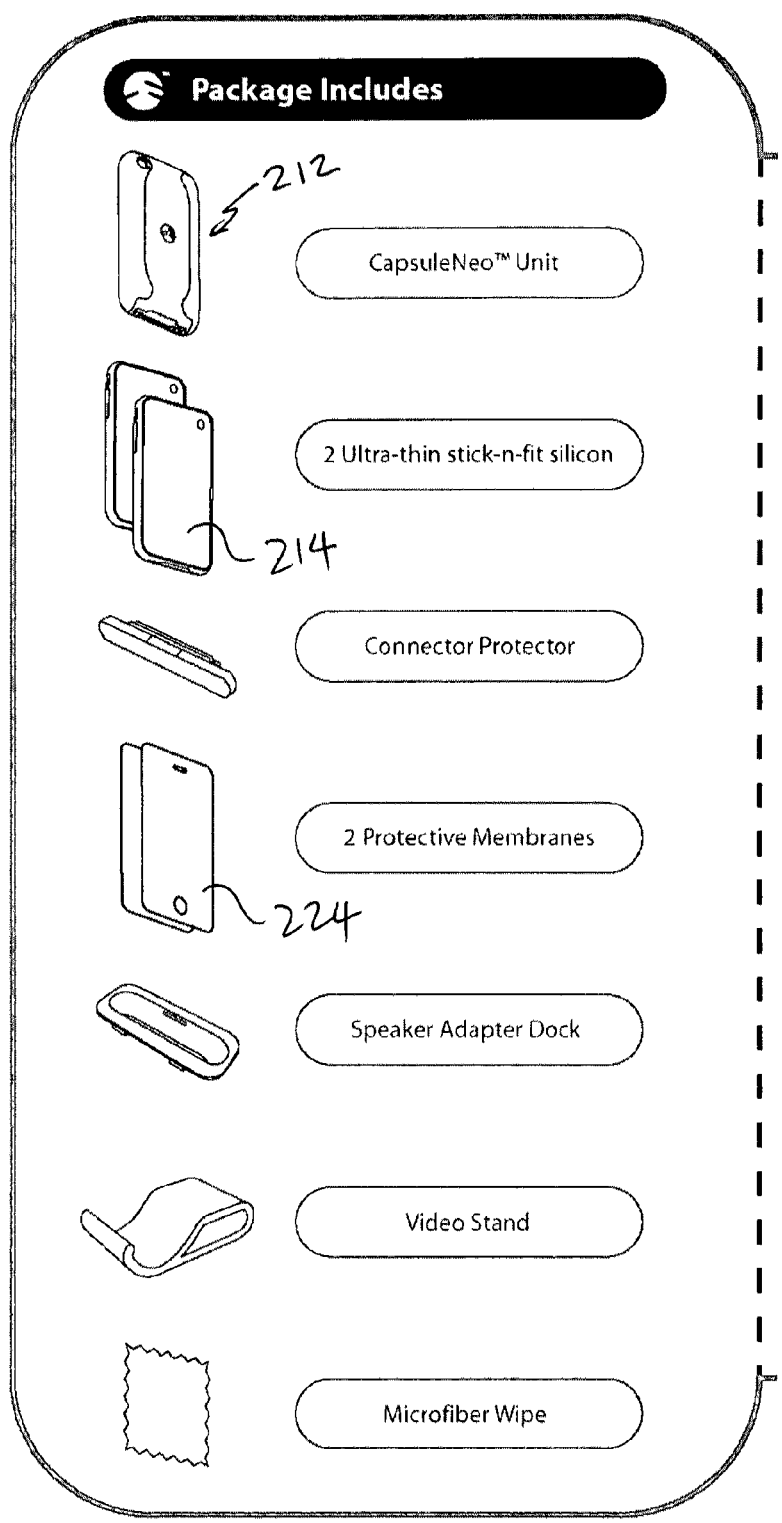
FIGS. 29A to 29D are reproduction of the product manual for the protective case above.
Figure 29B:
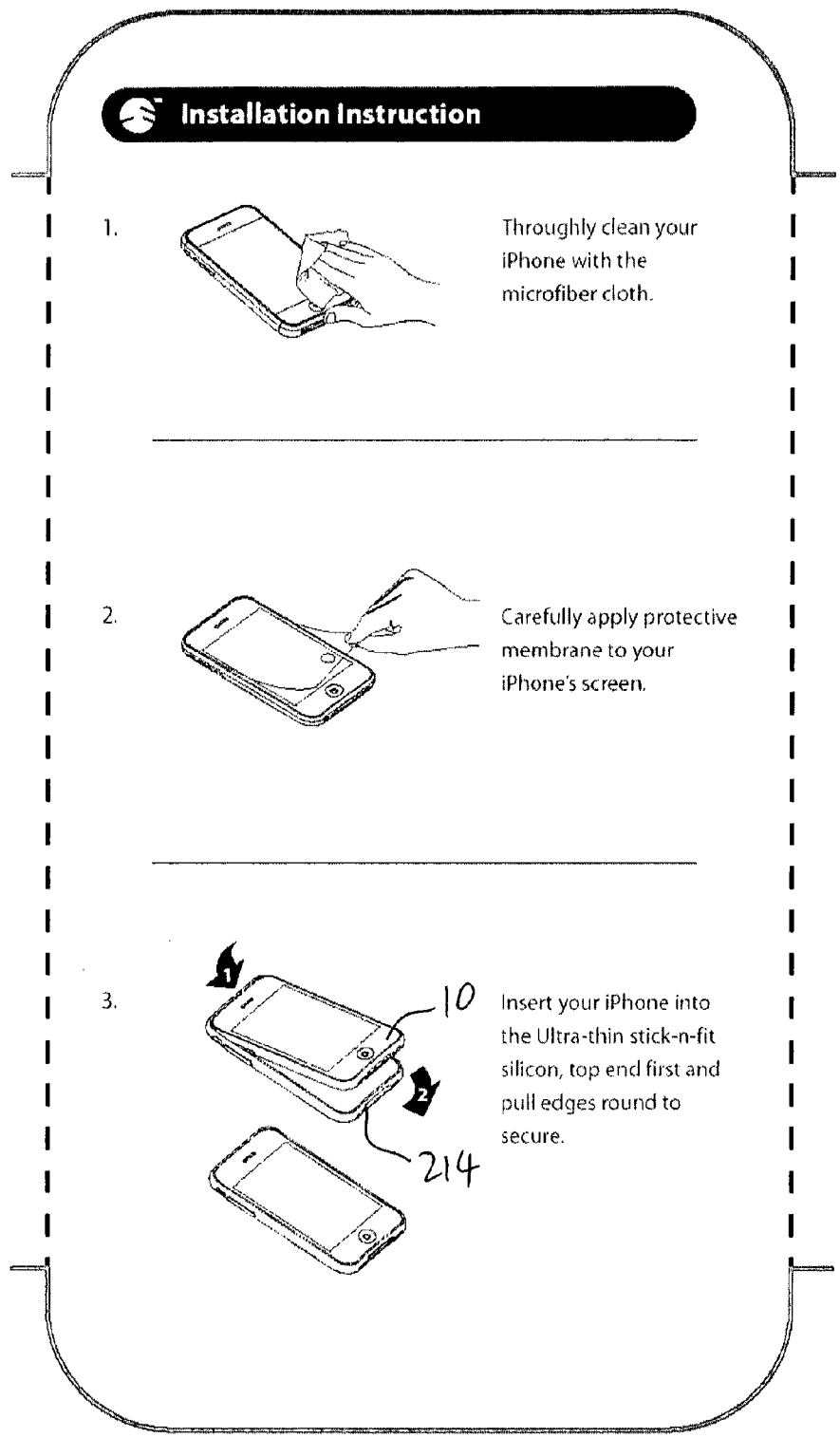
Figure 29C:
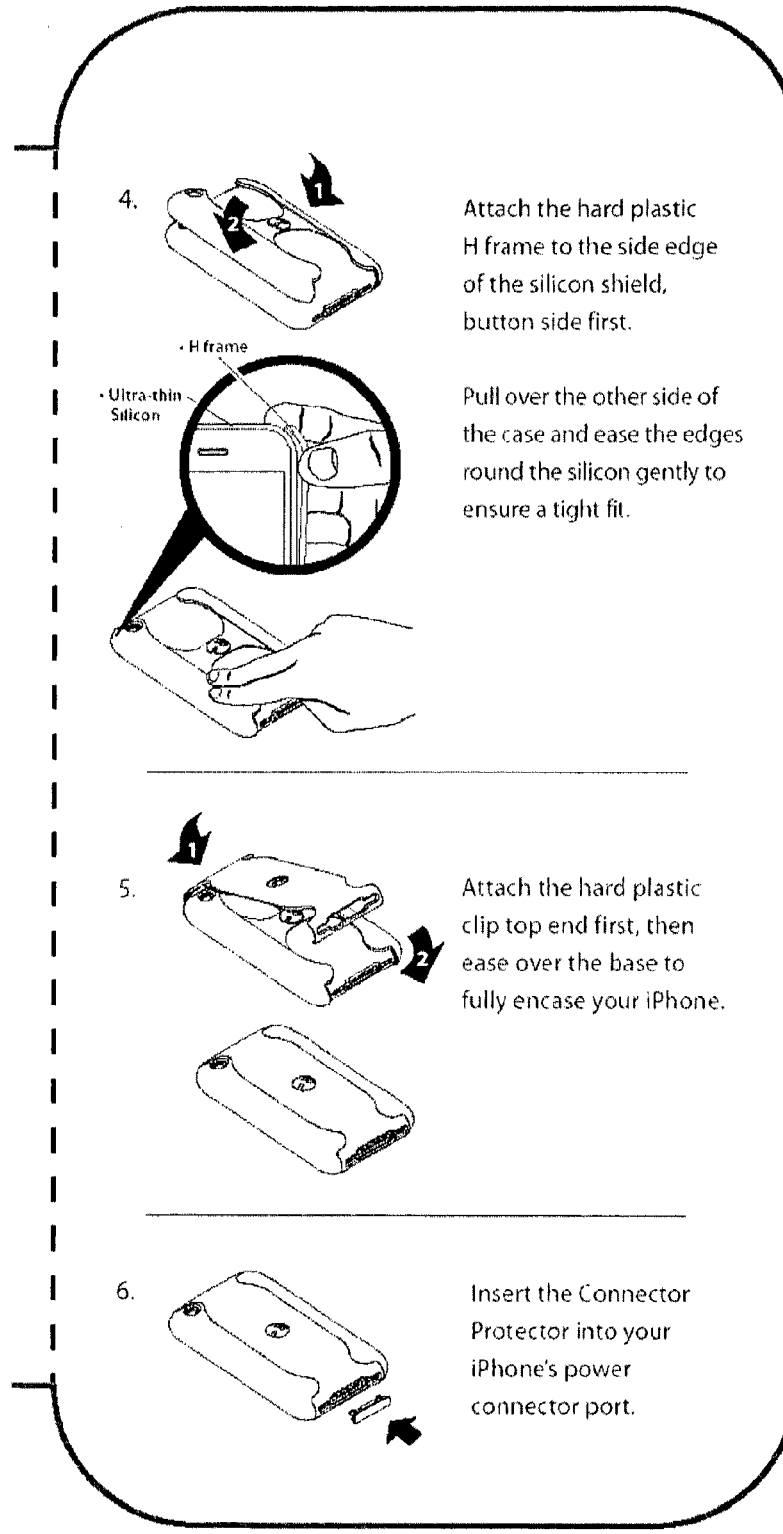
Figure 29D:
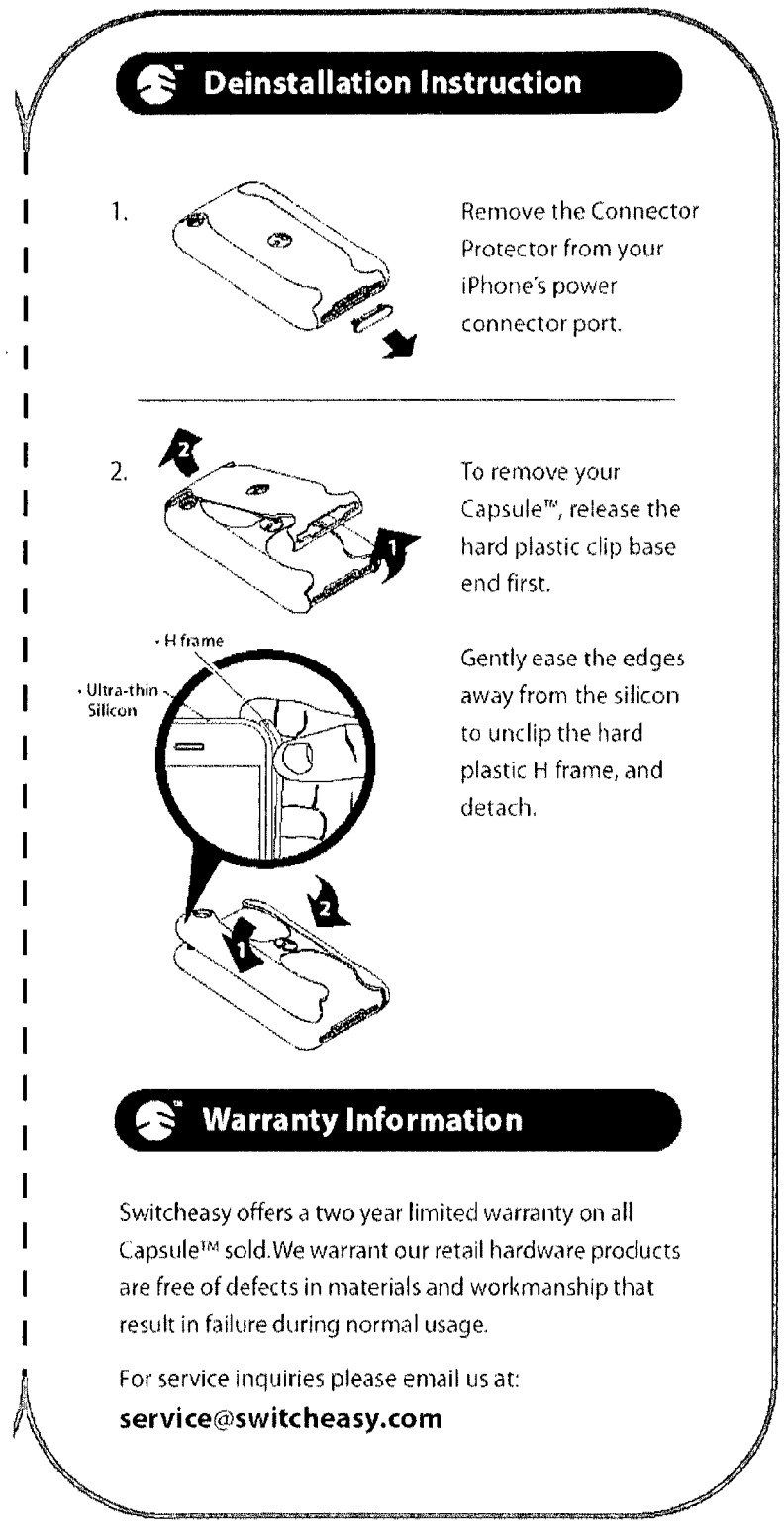

Instead of a single claw-shaped hard exoskeleton frame piece as in the previous embodiment, a 2-piece hard frame comprising a combination of the I-clip 215 and H-frame 216 is applied to the soft skin 214. Both the H-frame 215 and the I-clip 216 are each of a single piece, monolithic or unitary structure. The hard plastic H-frame 216 (e.g. having a structure symmetrical about a longitudinal axis of the phone 10) covers over the skin 214, at locations near and along the longitudinal edges and at the corners of the phone 10, to protect at least the corners and side (e.g., longitudinal) edges and part of the rear of the phone 10. Referring to FIG. 22, the H-frame 216 comprises two longitudinal sections 250 and 252 having generally C-shaped sections for grasping or hooking onto the longitudinal peripheral edges and corners of the phone 10 with a tight snap fit. The longitudinal sections 250 and 252 of the H-frame 216 are interconnected by a cross section 254. The thickness of material at the cross section 254 is thinner than that of the adjacent longitudinal sections 250 and 252 (the outward facing surface at the cross section 254 is below or indented from the adjacent outward facing surfaces of the longitudinal sections 250 and 252). The thinner cross section 254 facilitates flexing despite the hard material of the H-frame 216, so that the longitudinal sections 250 and 252 can be locked over the longitudinal edges and corners of the device 10.

The I-clip 215 has a structure symmetrical about a longitudinal axis. It clips and mates with the H-frame at the back of the phone 10 to cover the remaining top and bottom edges of the phone 10, thus covering the entire phone 10 in hard plastic (apart from the screen). The inward facing surface of the I-clip 215 is indented at the center section that faces the cross section 254 of the H-frame 216. The shape and thickness of the indentation at center section of the I-clip 215 (i.e., the section of the I-clip 215 that will cover the cross section 254 of the H-frame) is sized and shaped to complement or match the shape and thickness of the cross section 254, so that when the center section of the I-clip 215 covers the cross section of the H-frame 216, the I-clip 215 is substantially flush with or protruding only slightly above the outer surface of the H-frame 216, to provide an aesthetic seamless appearance. Thin flanges may be provided along the inside edges of the longitudinal sections 250 and 252, to support the edges of the I-clip 215 if they are of reduced thickness to complement the flanges to provide a flush finish with the H-frame 216. (See also the embodiment illustrated in FIGS. 30 to 34.)

When the I-clip 215 is applied to the H-frame 216, it covers the portions of the device 10 not covered by the H-frame 216. When the I-clip is clipped over the skin 214 and the H-frame 216, it forms flush and continuous sections with the H-frame 216, along the top and bottom edges of the device 10, as the I-clip 215 grips the top and bottom edges of the device 10. The combination of H-frame 216 and I-clip 215 structure offers a 7-point locking mechanism that securely protects the device 10, e.g., from damage when it is accidentally dropped. The H-frame 216 locks the four corner points of the device 10. The I-clip 215 clips and locks tightly or snuggly around the top and bottom edge portions (i.e., at two additional points) of the device 10. The device 10 is thus secured protected by the hybrid structure of the protective case 212. To top it off, the I-clip 215 and the H-frame 216 are secured in place by a center lock that comprises complementary embossed pattern (raised structure) and complementary hole (or channels or grooves). In the illustrated embodiment, the H-frame 216 has a raised embossed pattern 260 at the cross section 254, which mates with a matched shaped hole 262 in the center of the I-clip 215. The embossed pattern 260 and hole 262 may conveniently take the shape of the company logo of the manufacturer, or simply a circle, square or other geometrical shapes.

The hard H-frame 216 thus interlocks with the I-clip 215. The I-clip 215 acts like a brace that interlocks with the H-frame 216. It can be appreciated that the combination of the H-frame 216 and the I-clip 215 forms an interlocking structure that is robust, providing a hard portion strategically protecting the back of the device and the more vulnerable edges and corners of the device 10, and further combining with the skin 214 for protecting the delicate finish of the device 10.

In this embodiment, unlike the previous embodiment, the H-frame 216 and the I-clip 215 together cover substantially the entire skin 214. The relative coverage of the H-frame 216 over the skin 214 (as compared to the I-clip 215) may be 10-90%, preferably 30-70%, and more preferably about 50%.

The soft skin 214 may be made of silicon, soft rubber, or the like flexible, soft, and pliant material. The H-frame 216 and the I-clip 215 may be made of polycarbonate (e.g., available under the common commercial name of LEXAN®), or other material that is hard and stiff but provides some flexibility for slight bending to clip the H-frame 216 onto the skin 214 on the device 10, and to clip the I-clip 215 onto phone to interlock with the H-frame 216. The H-frame and the I-clip may be made of different material. For example, the H-frame may be made of a softer material, and the I-clip may be made of a harder material, or vice versa.

Alternatively, the frame 216 and/or the I-clip 215 of the protective case 212 may be made of metal (e.g., aluminum, titanium, or light alloy). The H-frame 16 and/or I-clip 215 may be available in different colors, textures, finishes, materials, etc. (e.g., the outside surface of the I-clip 215 is finished with a rubberized texture or coating, such as a polyurethane coating), and may be interchangeable and/or mixed-and-matched so users can change the appearance of the protective case 212 to suit individual preferences.

An adhesive static membrane 224 is provided (preferably applied prior to putting on the silicon skin) to protect the screen of the device 10. The protective membrane 224 is substantially transparent or at least has a transparent window, and spanning at least the display section or preferably the entire front of the device. The personal electronic device held within the casing is viewable (and/or allow user touch interaction) through the window of transparent membrane 224.

In addition to the membrane covered window of the protective case 212 which allows the user to access the touch screen of the electronic device 10 held within, the skin 214, the H-frame 216 and the I-clip 215 are provided with complementary or matching openings 226 for external access to buttons, switches and ports on the electronic device 10 held within (e.g., headphone jack, charging port, docking port, on/off switch, scroll button, etc.), and an opening for a camera lens if provided on the electronic device 10.

FIGS. 29A to 29D are reproduction of the product manual for the "Neo" product described above in connection with the Apple iPhone. FIGS. 29A to 29D illustrate the steps of how the skin 214, the H-frame 216 and the I-clip 215 can be installed to protect the devices 10 (in this case the Apple iPhone) and uninstalled therefrom.

Figure 30:
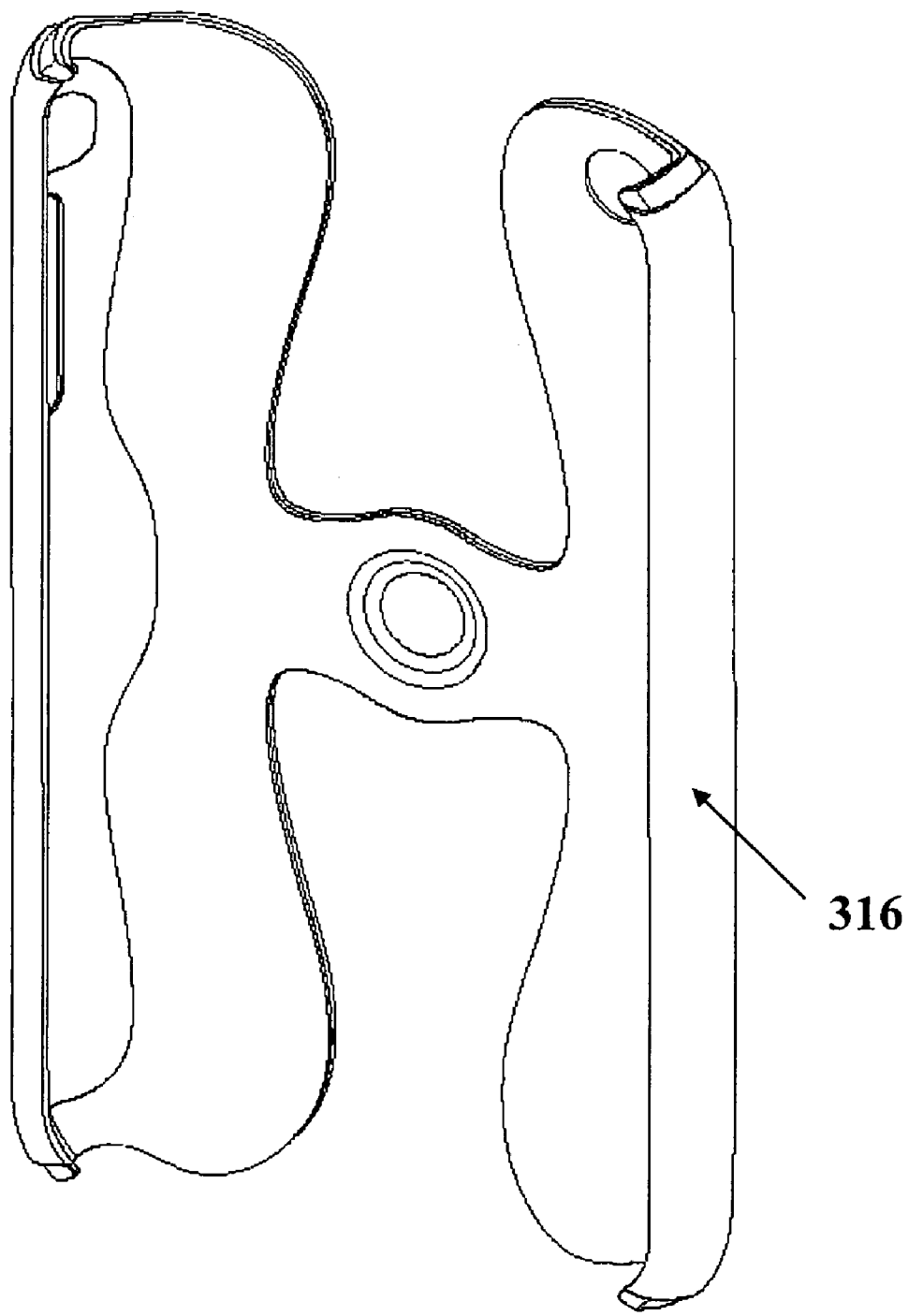
FIGS. 30 to 34 illustrate another embodiment of the 3-piece protective case.
Figure 31:
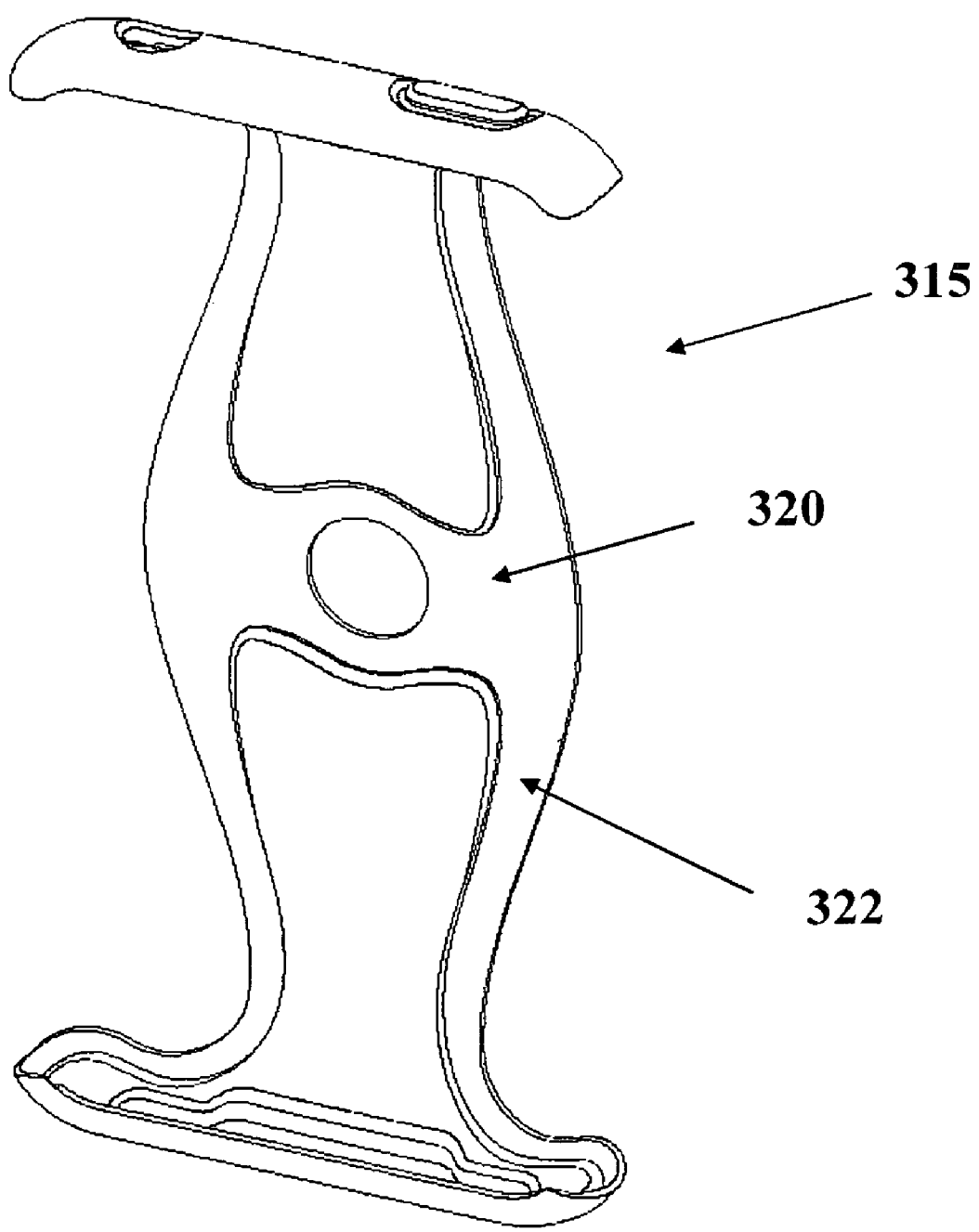
Figure 32:
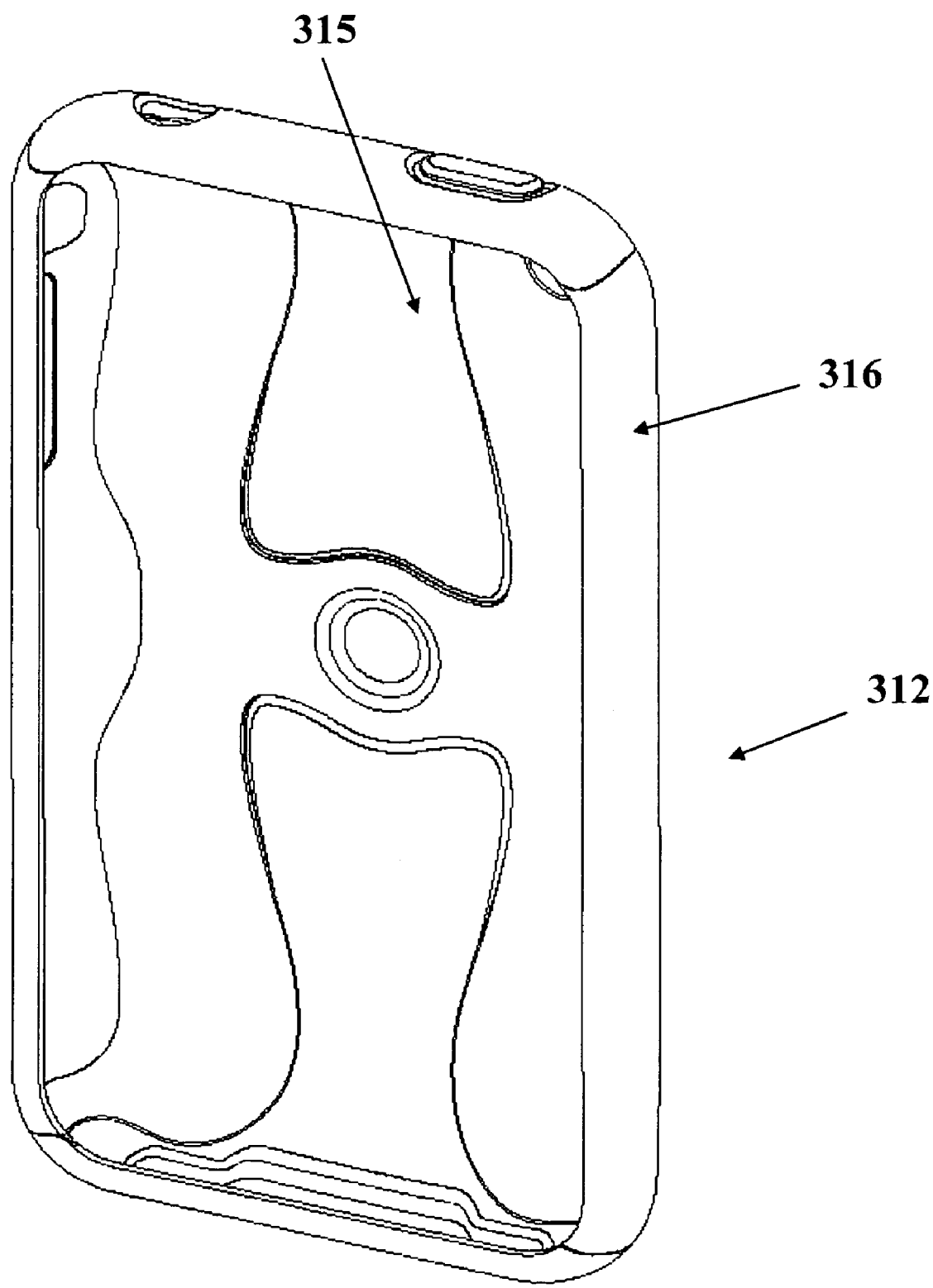
Figure 33:
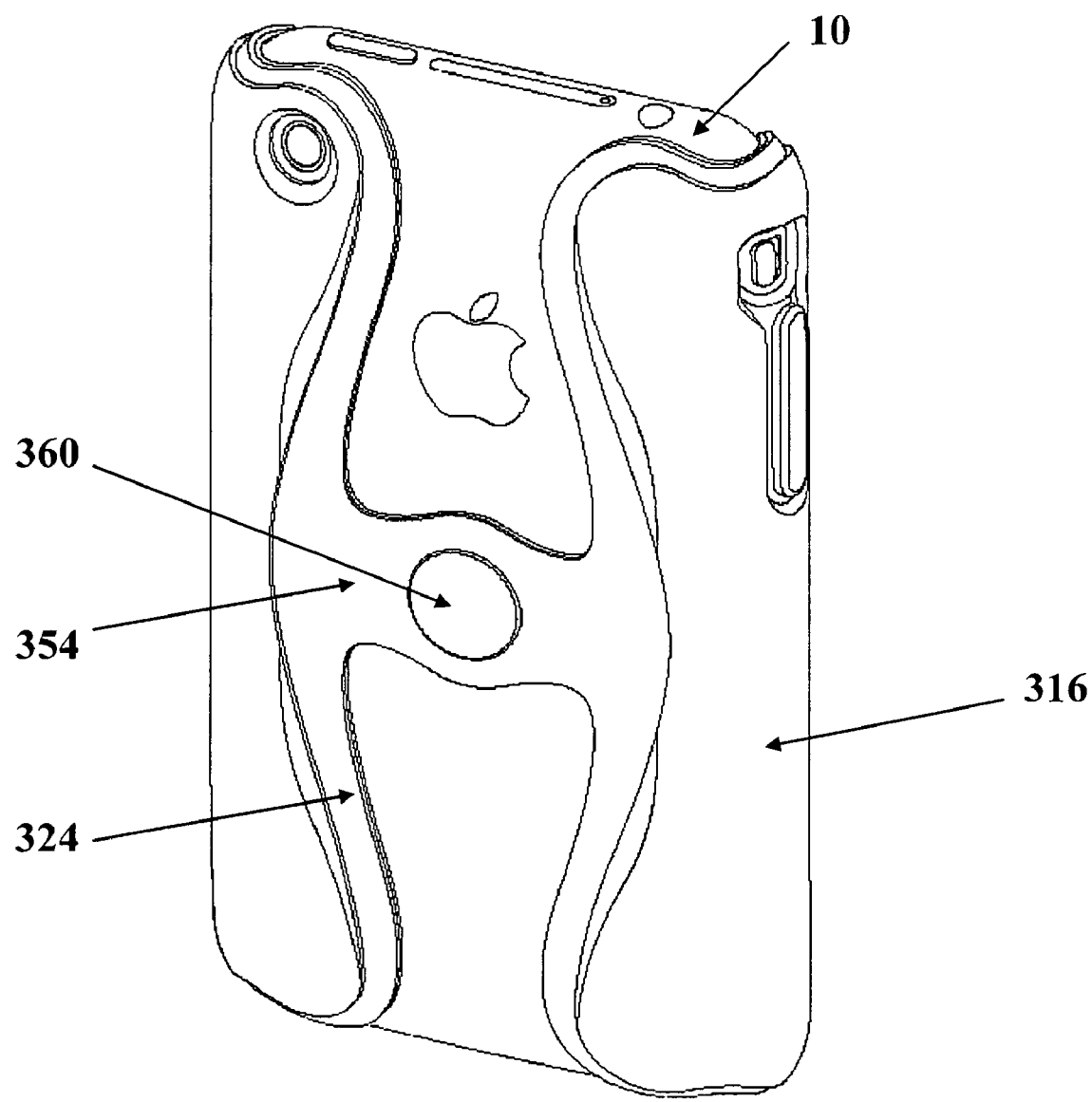
Figure 34:
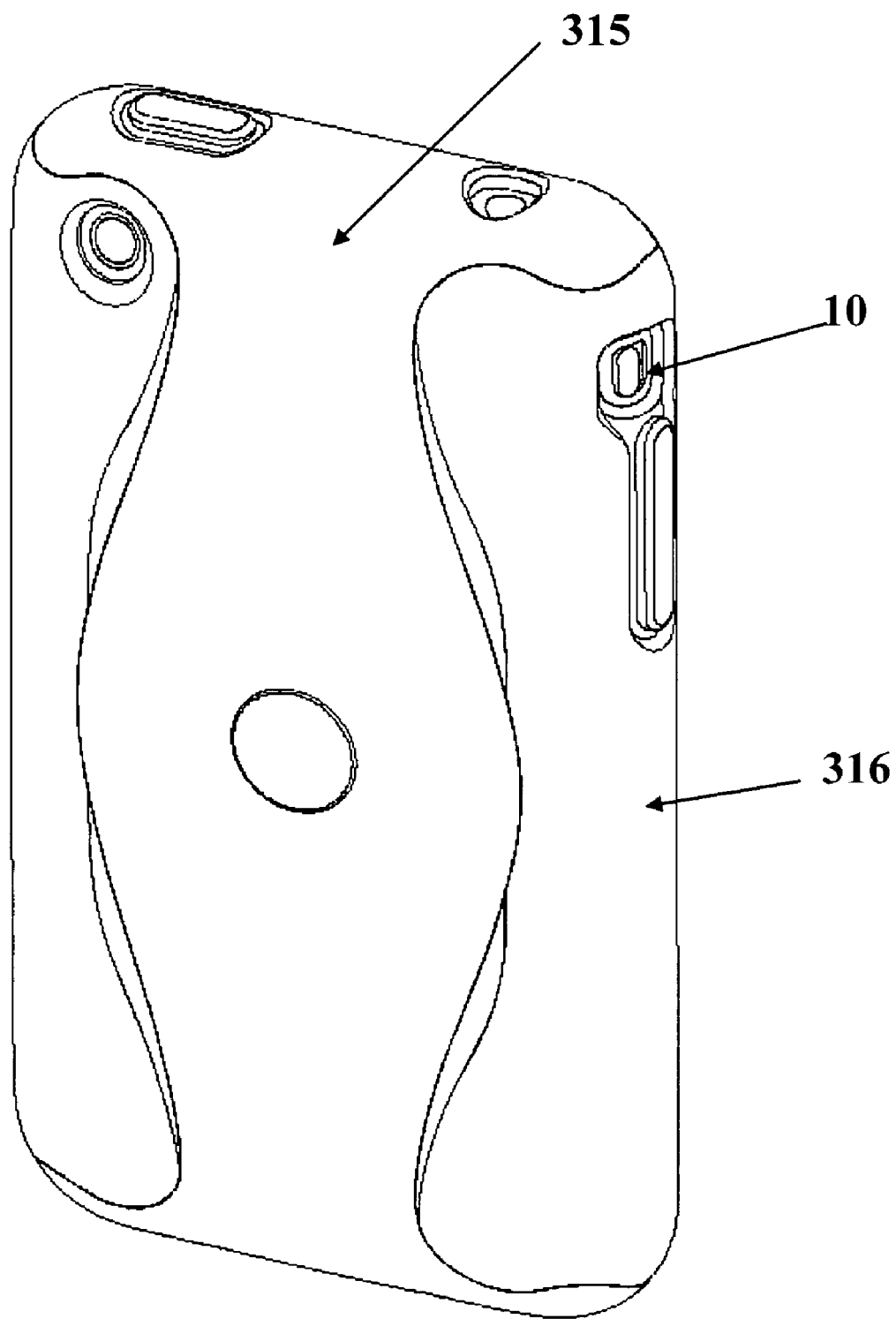

FIGS. 30 to 34 illustrate another embodiment of the 3-piece protective case 312, which is a variation of the embodiment illustrated in FIGS. 21 to 29. In this embodiment, the H-frame 316 and the I-clip 315 have overlapping flanges at the adjoining edges. FIG. 30 shows the H-frame 316 as viewed from the side facing the device 10 when installed. FIG. 31 shows the underside of I-clip 315, which faces the H-frame 316 and device 10 when installed. FIG. 32 shows the combination of the I-clip 315 and the H-frame 316, as viewed from the underside facing the device 10 when installed. FIG. 33 shows the outer surface of the H-frame 316, as installed on an electronic device 10. FIG. 34 shows the I-clip 315 installed on the H-frame 316 over the device 10. Comparing this embodiment to the embodiment of FIGS. 21 to 29, the I-clip 315 has center section 320 and longitudinal edge sections 322 having reduced thickness, and the H-frame 316 has indented flanges 324 along the longitudinal edges and indented cross section with raised/embossed pattern 360. The shape and depth of the flanges 324 on the H-frame are complementary to the shape and thickness of the edge sections 322 and center section 320 on the I-clip 315, so that when the center section of the I-clip 315 covers the cross section of the H-frame 316, the I-clip 315 is substantially flush with or protruding only slightly above the outer surface of the H-frame 316, to provide an aesthetic seamless appearance.

While the invention has been particularly shown and described with reference to the preferred embodiments, it will be understood by those skilled in the art that various changes in form and detail may be made without departing from the spirit, scope, and teaching of the invention. A person skilled in the art will recognize that the instrument incorporating the essence of this invention can also be used for storage of other types of collapsible items made from plastic or other soft and/or flexible materials. Accordingly, the disclosed invention is to be considered merely as illustrative and limited in scope only as specified in the appended claims.

The invention claimed is:

1. A protective case for a portable handheld electronic device, comprising:
   a first protective component, sized and configured to extend to fit snugly over at least a portion of a back and at least a portion of the perimeter of the electronic device, wherein the electronic device includes a display screen and at least one socket provided on the perimeter of the electronic device, wherein a window and at least one opening are provided on the first protective component, wherein the window is located on the first protective component to expose the display screen of the electronic device and said at least one opening is located on the first protective component to provide external access to said at least one socket provided on the perimeter of the electronic device, when the first protective component is fitted over the back of the electronic device, wherein the first protective component is sized and configured to extend to cover the entire back of the electronic device, and wherein the first protective component is sized and configured to extend to cover substantially entire perimeter of the electronic device; and
   a second protective component, sized and configured to extend to cover at least a portion of the first protective component, wherein the second protective component comprises a plurality of fingers extending to cover the first protective component over at least a portion of the perimeter of the electronic device.

2. The protective case as in claim 1, wherein the first protective component is provided with an indentation and the second protective component has a complementary structure received in the indentation.

3. The protective case as in claim 2, wherein the material of the second protective component is different from the material of the first protective component.

4. The protective case as in claim 3, wherein material of the second protective component is harder than that of the first protective component.

5. The protective case as in claim 2, wherein the second protective component is finished with textures.

6. The protective case as in claim 2, wherein the second protective component and the first protective component form an interlocking structure.

7. The protective case as in claim 1, wherein the second protective component is configured in the form of an exoskeleton frame.

8. The protective case as in claim 1, wherein the second protective component is configured in a monolithic structure.

9. The protective case as in claim 1, wherein the first protective component is sized and configured to extend to cover the entire back of the electronic device.

10. The protective case as in claim 9, wherein the first protective component is sized and configured to extend to cover substantially entire perimeter of the electronic device.

11. A protective case for a portable handheld electronic device, comprising:
 a first protective component, sized and configured to extend to fit snugly over at least a portion of a back and at least a portion of the perimeter of the electronic device, wherein the first protective component is sized and configured to extend to cover the entire back of the electronic device, and wherein the first protective component is sized and configured to extend to cover substantially entire perimeter of the electronic device; and
 a second protective component, sized and configured to extend to cover at least a portion of the first protective component, wherein the second protective component comprises a plurality of fingers extending to cover the first protective component over at least a portion of the perimeter of the electronic device.

12. The protective case as in claim 11, wherein the fingers extend to cover the first protective component over at least corners of the perimeter of the electronic device.

13. The protective case as in claim 11, wherein the fingers extend from a spine.

14. The protective case as in claim 13, wherein the fingers are symmetrical about the spine.

15. The protective case as in claim 1, wherein 10-90% of the first protective component is covered by the second protective component.

16. The protective case as in claim 15, wherein 30-70% of the first protective component covered by the second protective component.

17. A protective case for a portable handheld electronic device, comprising:
 a first protective component, sized and configured to extend to fit snugly over at least a portion of a back and at least a portion of the perimeter of the electronic device; and
 a second protective component, sized and configured to extend to cover at least a portion of the first protective component, wherein the second protective component comprises a plurality of fingers extending to cover the first protective component over at least a portion of the perimeter of the electronic device;
 wherein the electronic device includes a display screen and at least one socket provided on the perimeter of the electronic device, wherein a window and at least one opening are provided on the first protective component, and wherein the window is located on the first protective component to expose the display screen of the electronic device and said at least one opening is located on the first protective component to provide external access to said at least one socket provided on the perimeter of the electronic device, when the first protective component is fitted over the back of the electronic device, and
 wherein the first protective component has an overall external shape resembling overall external shape of the electronic device, so as to minimize overall size of combination of the protective case and electronic device when the first protective component is fitted over the back of the electronic device.

18. A protective case for a portable handheld electronic device, comprising:
 a first protective component, sized and configured to extend to fit snugly over at least a portion of a back and at least a portion of the perimeter of the electronic device; and
 a second protective component, sized and configured to extend to cover at least a portion of the first protective component, wherein the second protective component comprises a plurality of fingers extending to cover the first protective component over at least a portion of the perimeter of the electronic device;
 wherein the electronic device includes a display screen and at least one socket provided on the perimeter of the electronic device, wherein a window and at least one opening are provided on the first protective component, and wherein the window is located on the first protective component to expose the display screen of the electronic device and said at least one opening is located on the first protective component to provide external access to said at least one socket provided on the perimeter of the electronic device, when the first protective component is fitted over the back of the electronic device, and
 wherein the first protective component has a generally flat overall external shape, and an internal shape configured to fit over the electronic device having a generally flat overall external shape.

19. The protective case as in claim 1, wherein the electronic device further includes a camera having a lens at the back of the electronic device, and wherein the first protective component is provided with a further opening to expose the lens when the protective component is fitted over the back of the electronic device.

20. The protective case as in claim 1, wherein said at least one socket includes a charging socket and said at least one opening is located on the first protective component for external access to the charging socket.

21. The protective case as in claim 20, wherein said at least one socket further includes a headphone jack, and wherein said at least one opening further includes an opening located on the first protective component to provide external access to the headphone jack on the electronic device when the first protective component is fitted over the back of the electronic device.

* * * * *